US012783584B2

(12) United States Patent
Hartmann et al.

(10) Patent No.: US 12,783,584 B2
(45) Date of Patent: Nov. 3, 2026

(54) PREEMPTIVE GENERATION OF GENERATIVE MODEL OUTPUT(S)

(71) Applicant: GOOGLE LLC, Mountain View, CA (US)

(72) Inventors: Florian Nils Hartmann, Zurich (CH); Matthew Sharifi, Kilchberg (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/887,806

(22) Filed: Sep. 17, 2024

(65) Prior Publication Data

US 2026/0080012 A1 Mar. 19, 2026

(51) Int. Cl.
*G06F 16/9032* (2019.01)

(52) U.S. Cl.
CPC .. *G06F 16/90324* (2019.01); *G06F 16/90332* (2019.01)

(58) Field of Classification Search
None
See application file for complete search history.

(56) References Cited

U.S. PATENT DOCUMENTS 11,960,983 B1 * 4/2024 Gelfenbeyn .......... A63F 13/424
2018/0246896 A1 8/2018 Bailey et al.
2019/0370393 A1 * 12/2019 Finch ........................ G06N 3/08
2020/0104427 A1 4/2020 Long et al.
2021/0124782 A1 * 4/2021 Karaca .............. G06F 16/90328
2021/0157813 A1 * 5/2021 Hammad .......... G06F 16/24553
2022/0067104 A1 3/2022 Prakash et al.
2022/0197900 A1 6/2022 Maheshwari et al.
2023/0142836 A1 * 5/2023 Tang ..................... G06F 16/433 704/232
2023/0237053 A1 7/2023 Dangoor et al.
2024/0419835 A1 * 12/2024 Karlberg ............. G06F 16/3329
2025/0156451 A1 * 5/2025 Jensen ................ G06F 16/3322
2025/0209266 A1 * 6/2025 Lu ........................... G06F 40/40
2025/0265290 A1 * 8/2025 Jia .......................... G06F 16/538
2025/0348349 A1 * 11/2025 Abdollahian Noghabi ................ G06F 16/172

OTHER PUBLICATIONS

Dhruv Matani "Language Models for Sentence Completion" Towards Data Science. 25 pages, dated Sep. 15, 2023.
European Patent Office, Communication issued in Application No. 25199131.1, 10 pages, dated Dec. 12, 2025.

* cited by examiner

*Primary Examiner* — Giuseppi Giuliani
(74) *Attorney, Agent, or Firm* — Gray Ice Higdon

(57) ABSTRACT

Various implementations include reducing latency when interacting with a generative model system based on generating predicted complete text based on natural language (NL) text input, where the NL text input is a portion of a user query. In many implementations, predicted completion text can be generated by processing NL text input using a language model. In several implementations, the system can perform initial processing of the NL input text and the predicted completion text (e.g., preform initial preprocessing of the NL input text and predicted completion text for processing using the generative model, performing an initial limited decoding of output using the generative model, etc.). The user can confirm the predicted completion text before the system continues processing the NL input and predicted completion text using the generative model to generate output.

20 Claims, 13 Drawing Sheets

PREEMPTIVE GENERATION OF GENERATIVE MODEL OUTPUT(S)

BACKGROUND

Generative models (GMs), such as large language models (LLMs), are machine learning models that are trained on enormous amounts of diverse data that can perform various natural language processing (NLP) tasks and/or other task(s). Recent developments have integrated aspects into LLMs into interpreting and responding to various inputs, such as natural language (NL) based input provided by a user during a human-to-computer dialog session.

However, processing input using a generative model is computationally expensive. This can lead to actual and/or user-perceived latency between the time when a user enters NL based input for processing and the time when the user receives a response generated using the generative model (e.g., latency between the user starting the query and the user seeing the initial results to their query based on processing using the generative model).

SUMMARY

Implementations described herein are directed towards reducing latency between the time a user indicates the end of a user query and the time a generative model system renders output responsive to the user query. In some implementations, the user interacts with a generative model system that can preemptively generate predicted completion text based on processing NL input text using a language model, where the NL input text is provided by the user and is a portion of the user query. In other words, the system can generate a prediction of an additional portion of the user query (e.g., the predicted completion text) based on the user provided NL input text portion of the user query. Additionally or alternatively, the system can perform initial processing of the NL input text and the predicted completion text (e.g., a prediction of the complete user interface input) using a generative model to generate predicted output.

In some implementations, the system can generate a predicted completion output based on processing the NL input text portion of the user query using the language model, where the predicted completion output is a predicted completion of the user query. In some implementations, the system can render output based on the predicted completion text to the user, allowing the user to quickly confirm the user query. Additionally or alternatively, initial processing of the predicted completion text can be performed using the generative model without performing full processing of the predicted completion text with the generative model. In some implementations, the initial processing includes generating an initial portion of output responsive to the predicted user query, where the initial portion of output can be rendered for the user in addition to the corresponding predicted completion text. The user can determine whether to select the predicted completion text based (in part) on the initial portion of output. By rendering an initial portion of output, the user can make a more informed decision when confirming the user query (by selecting the predicted completion text). The more informed decision by the user can reduce the overall duration of the interaction of the user with the client device (compared to the user selecting predicted completion text for full processing using the generative model, when the user would have not selected the predicted completion text based on the initial portion of output). Further client device resources (e.g., battery, memory, processor cycles, etc.) can be conserved by reducing the duration of the interaction of the user with the client device. In other words, the user interacting with the generative model via the client device is computationally expensive, and reducing the duration of the interaction between the user and the client device further conserves client device resources).

If the user selects the predicted completion text, the system can continue processing the predicted completion text using the generative model without having to re-perform the initial processing, thus decreasing latency between the user confirming the user query (e.g., selecting the predicted completion text) and rendering the output to the user. Additionally or alternatively, various implementations balance latency reduction with computational resource efficiency by only performing initial processing of the predicted completion text. In other words, while reducing latency, the system can also reduce computational resource usage by not performing full processing of the predicted completion text.

In some implementations, the user can interact with the generative model via a client device through a user interface (such as a digital assistant). In some of those implementations, the user can type a user query via one or more user interface input devices of the client device (e.g., a keyboard, a touch screen, etc.); the user can speak the user query where audio data capturing the user query can be processed via one or more microphones of the client device and a text representation of the user query can be generated based on processing the audio data using a speech recognition model; the user can speak the user query where audio data is directly capturing the user query is directly processed by the system; etc. While the user is typing the user query, the system can begin processing a portion of the user query using a language model to generate predicted completion text.

For example, the user can begin typing the user query of "How do I get to Hypothetical Café" into the user interface of the client device. While the user is providing the user query, the system can process a NL input text portion of the user query of "How do I get to" using the language model to generate first predicted completion text of "Hypothetical Café", to generate second predicted completion text of "Hypothetical Pizza Parlor", and third predicted completion text of "Hypothetical Sandwich Shop".

In some implementations, the system can process the NL input text portion of the user query using the language model to generate multiple hypotheses for the predicted completion text. In some of those implementations, each hypothesis for the predicted completion text has a corresponding confidence score, where the confidence score is an indication of the likelihood the corresponding predicted completion text will be provided by the user to complete the user query. Additionally or alternatively, the language model used to process the NL text input to generate predicted completion text can be personalized for the user to increase the accuracy of predicted completion text. For example, the language model can be personalized to the user based on prior user queries, based on information stored in a user profile of the user, based on additional or alternative information, and/or combinations thereof. In some implementations, the language model used to generate predicted completion text can be the same model used in processing the user query to generate the predicted output.

In some implementations, the confidence score can be generated using the language model (e.g., the language model can generate predicted completion text and a corresponding confidence score). For example, the system can process the NL input text of "How do I get to" using the language model to generate a first confidence score of 0.6 corresponding to the first predicted completion text of "Hypothetical Café", a second confidence score of 0.3 corresponding to the second predicted completion text of "Hypothetical Pizza Parlor", and a third confidence score of 0.1 corresponding to the third predicted completion text of "Hypothetical Sandwich Shop". Additionally or alternatively, the predicted completion text can be processed using an additional model (e.g., a confidence score model) to generate a corresponding confidence score. For example, the system can process the first predicted completion text of "Hypothetical Café" using a confidence score model to generate the first confidence score of 0.6; the second predicted completion text of "Hypothetical Pizza Parlor" using the confidence model to generate the second confidence score of 0.3; and the third predicted completion text of "Hypothetical Sandwich Shop" using the confidence score model to generate the third confidence score of 0.1.

In some implementations, the system can determine whether to initially process one or more instances of predicted completion text based on determining whether one or more corresponding confidence scores satisfies one or more conditions. In some implementations, the system can process the predicted completion text with the highest confidence score. For example, the system can determine the predicted completion text of "Hypothetical Café" has the highest confidence score of 0.6 (where the first confidence score of 0.6 corresponding to "Hypothetical Café" is greater than the second confidence score of 0.3 corresponding to "Hypothetical Pizza Place" and is greater than the third confidence score of 0.1 corresponding to "Hypothetical Sandwich Shop".

Additionally or alternatively, the system can determine to initially process predicted completion texts with the top-K corresponding confidence scores. For example, the system can determine to initially process the predicted completion texts of the top 2 corresponding confidence score values of "Hypothetical Café" (with a first confidence score of 0.6) and "Hypothetical Pizza Parlor" (with a second confidence score of 0.3) (where 0.6 and 0.3 are greater than the third confidence score of 0.1 corresponding to the third predicted completion text of "Hypothetical Sandwich Shop").

In some implementations, the system can determine to initially process predicted completion text when the corresponding confidence score satisfies a threshold value. For example, when the threshold value is 0.5, the system can determine to perform initial processing of "Hypothetical Café" (where the corresponding confidence score of 0.6 is greater than the threshold value of 0.5) but to not perform initial processing of "Hypothetical Pizza Parlor (where the corresponding confidence score of 0.3 is less than the threshold value of 0.5) or "Hypothetical Sandwich Shop" (where the corresponding confidence score of 0.1 is less than the threshold value of 0.5). Similarly, when the threshold value is 0.7, the system can determine to not perform initial processing of any of the predicted completion text (where the first confidence score of 0.6, the second confidence score of 0.3, and the third confidence score of 0.1 are all less than the threshold value of 0.7). Furthermore, when the threshold value is 0.2, the system can determine to perform initial processing of "Hypothetical Café" (where the corresponding confidence score of 0.6 is greater than the threshold value of 0.2) and "Hypothetical Pizza Parlor" (where the corresponding confidence score of 0.3 is greater than the threshold value of 0.2), but can determine to not perform initial processing of "Hypothetical Sandwich Shop" (where the corresponding confidence score of 0.1 is less than the threshold value of 0.2).

In some implementations, the system can determine whether to perform initial processing of one or more instances of predicted completion text based on the availability of computing resources (e.g., processor cycles, memory, power, etc.). For example, the system can determine to perform initial processing on fewer instances of predicted completion text when fewer computing resources are available. Similarly, the system can determine to perform initial processing on more instances (or all instances) of predicted completion text when more computing resources are available. In some implementations, the system can perform the initial processing of the NL input text and predicted completion text using the generative model at a remote server. When the server load is low, the system can perform initial processing of all of the instances of predicted completion text (e.g., perform initial processing of "How do I get to Hypothetical Café", "How do I get to Hypothetical Pizza Parlor, and "How do I get to Hypothetical Sandwich Shop" in parallel at the server). In contrast, when the server load is high, the system can perform initial processing of only the instance of predicted completion text with the highest corresponding confidence score (e.g., perform initial processing of "How do I get to Hypothetical Café" based on the corresponding confidence score of 0.6).

In some implementations, the system can determine whether to perform initial processing of predicted completion text based on whether a set of the instances of predicted completion text capture a threshold percentage of the probability distribution of predicted completion text. In some of those implementations, the system can determine to perform initial processing of predicted completion text that covers a threshold percentage of the probability distribution. For example, a system can have a threshold percentage of the probability distribution of 75%, where the system performs initial processing of predicted completion text that covers 75% of the probability distribution. In some of those implementations, the predicted completion text "Hypothetical Café" covers 60% of the probability distribution (based on the corresponding confidence score of 0.6); "Hypothetical Pizza Parlor" covers 30% of the probability distribution (based on the corresponding confidence score of 0.3); and the predicted completion text "Hypothetical Sandwich Shop" covers 10% of the probability distribution (based on the corresponding confidence score of 0.3). The system can determine to perform initial processing of "Hypothetical Café" and "Hypothetical Pizza Parlor" based on 60%+30% satisfying the threshold percentage of 75%. In other words, the system can determine to not perform initial processing on additional predicted completion text when the system is performing initial processing of the majority of the probability distribution.

In some implementations, the system can perform initial processing on the selected predicted completion text by processing the predicted completion text using the generative model to generate a partial response to the user query. In some of those implementations, the system can render the partial response to the user when the corresponding instance of predicted completion text is confirmed by the user. Additionally or alternatively, the remainder of the output can be rendered to the user in a streaming manner as the output is generated by continuing processing the user query using the generative model. The user-perceived latency is reduced by rendering the initial output while the remaining portion of the output is being generated.

Additionally or alternatively, the initial processing can include processing the NL input text and the predicted completion text using the generative model where the system performs a limited number of decoding steps (e.g., running generative model inference with a small number of maximum decoding steps such as 50 tokens). In some versions of those implementations, by decoding a limited number of steps, the system can generate an initial response to the user query but at a low computing resource cost compared to performing full inference using the generative model.

In some implementations, the initial processing can prepare the generative model for processing of the user query (e.g., the NL text input+predicted completion text). When the user confirms the user query, the system can immediately process the user query using the generative model without needing to take the time to perform this initial processing. By performing this processing before the user has confirmed the user query, the overall time to process the user query can be reduced (i.e., the latency in processing the user query is reduced). For instance, the system can perform one or more lookups in a vector database based on the NL input text and the predicted completion text (where the NL input text+the predicted completion text is the user query). Additionally or alternatively, the system can run tokenization, embedding, encoder, pre-fill operations, and/or additional or alternative operations. In some other implementations, the system can perform tool use calls using the NL input text and predicted completion text (e.g., the user query) and cache those results to be used once the user confirms the user query.

Accordingly, various implementations set forth techniques for reducing user-perceived latency between when a user submits a user query to a generative model and when the system provides responsive output to the user. In some implementations, the system can process a portion of the user query (i.e., a NL input text portion of the user query) using a language model to generate one or more instances of predicted completion text. The system can perform initial processing on one or more instances of the predicted completion text while the user is finishing providing the user query.

In some implementations, the system can perform a limited number of decoding steps (e.g., running generative model inference with a small number of maximum decoding steps). By doing so, the system can generate an initial response to the user query at a low computational cost compared to running full inference using the generative model. Additionally or alternatively, the initial processing can include processing the NL input text and the predicted completion text using the generative model where the system performs a limited number of decoding steps (e.g., running generative model inference with a small number of maximum decoding steps such as 50 tokens). In some versions of those implementations, by decoding a limited number of steps, the system can generate an initial response to the user query but at a low computing resource cost compared to performing full inference using the generative model. As soon as the user confirms the predicted completion text, the system can immediately render the initial portion of the response at a low computational cost.

The above description is provided only as an overview of some implementations disclosed herein. These and other implementations of the technology are disclosed in additional detail below. It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figures 1A, 1B:
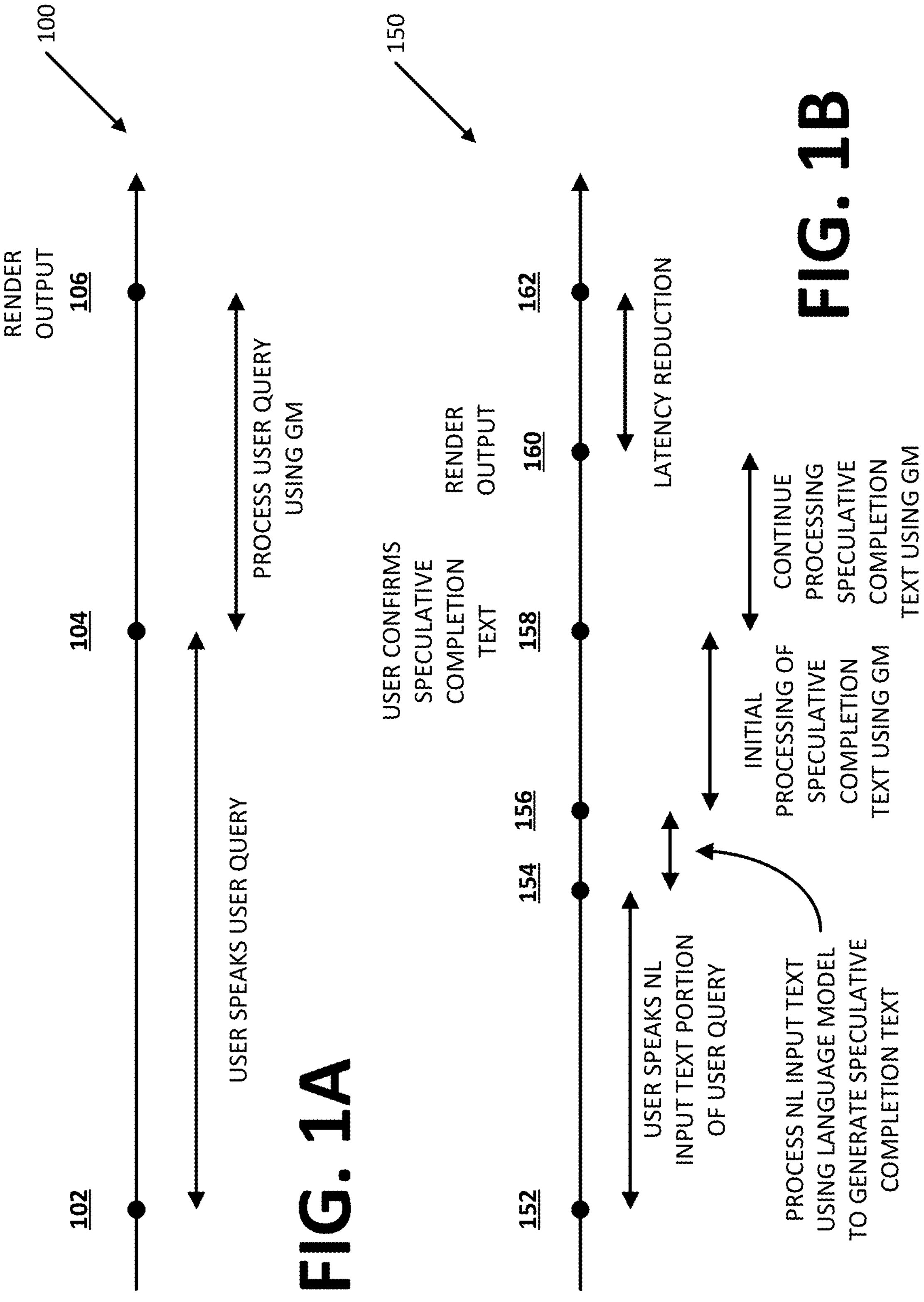
FIG. 1A illustrates an example of rendering output based on processing a user query using a generative model.
FIG. 1B illustrates another example of rendering output based on processing a user query using a generative model with latency reduction in accordance with various implementations disclosed herein.

Turning now to the figures, FIG. 1A illustrates an example of generating output based on processing user interface input using a generative model in accordance with various implementations. In the illustrated example 100, the user begins speaking a user query at point 102 and completes speaking the user query at point 104. The system begins processing the user query using a generative model (GM) to generate output at point 104. The system finishes generating the output based on processing the user query using the GM at point 106. Additionally or alternatively, the system can render the output at point 106. In some implementations, the time from point 104 (i.e., when the user finishes speaking the user query and the system begins processing the user query using the GM) to point 106 (i.e., when the system completes generating the output based on processing the user query using the GM and the system renders the output) is user-perceived latency.

For example, the user can begin speaking the user query of "How do I write a function to sort a list in C++" at point 102 and can finish speaking the user query at point 104. The system can being processing the user query of "How do I write a function to sort a list in C++" using the GM at point 104, and can generate output of "To sort a list in C++ you can use the std::sort( ) function" at point 106. Similarly, the system can render output of "To sort a list in C++ you can use the std::sort( ) function" to the user at point 106. In the illustrated example 100, the user-perceived latency is the delay between when the user finishes speaking the user query of "How do I write a function to sort a list in C++" at point 104 and when the system renders the output of "To sort a list in C++ you can use the std::sort( ) function" at point 106.

FIG. 1B illustrates another example of generating output based on processing user interface input using a generative model in accordance with various implementations. In the illustrated example 150, the user begins speaking the user query at point 152. However, in contrast with FIG. 1A, the system begins processing a portion of the user query while the user is speaking. The user finishes speaking a NL text input portion of the user query at point 154. Additionally or alternatively, the system can begin processing the NL text input portion using a language model to generate speculative completion text at point 154. In some implementations, the user can continue speaking the user query (not depicted) and can finish speaking the user query at point 158.

At point 154, the system can begin processing the NL input text portion of the user query using a language model to generate speculative completion text. Similarly, at point 156 the system can finish processing the NL input text portion of the user query using the language model to generate speculative completion text. Additionally or alternatively, at point 156 the system can begin initial processing of the NL input text and speculative completion text using the generative model. At point 158, the system can confirm whether the speculative completion text is part of the user query. In some implementations, the user can confirm the speculative completion text by finishing speaking the user query (e.g., the speculative completion text can be confirmed if it matches the user query actually spoken by the user). Additionally or alternatively, the system can render output based on the speculative completion text, and the user can confirm the speculative completion text by selecting the rendered output.

In some implementations, the system can continue processing the NL input text and speculative completion text using the generative model at point 158 and can complete processing the NL text input and speculative completion text at point 160. The system can render output to the user at point 160. In some implementations, the time between point 160 (e.g., when the output is rendered) and point 162 (e.g., when the output would have been rendered without the initial processing) is the reduction in user-perceived latency. In the illustrated example 150, the system can render output to the user earlier due to initial processing before the speculative completion text is confirmed. In other words, some of the processing of the user query using the generative model is performed based on a speculation of the full user query. By performing initial processing before the user has provided the entire user query, the user-perceived latency is reduced.

For example, the system in example 150 of FIG. 1B can process the same user query of "How do I write a function to sort a list in C++" that is described above with respect to example 100 of FIG. 1A. The user can begin speaking the user query at point 152. However, in contrast to FIG. 1A, the system can begin processing a portion of the user query of "How do I write a function to sort a list" (e.g., begin processing the NL text input portion of the user query) at point 154. In some implementations, the system can process the NL input text of "How do I write a function to sort a list" using a language model to generate the predicted completion text of "in C++".

At point 156, the system can begin initial processing of the NL input text of "How do I sort a list" and the predicted completion text of "in C++" using the generative model. The user can confirm the predicted completion text of "in C++" at point 158. In some implementations, the system can continue processing "How do I write a function to sort a list in C++" using the generative model to generate output of "To sort a list in C++ you can use the std::sort( ) function" at point 160. At point 160, the system can render output "To sort a list in C++ you can use the std::sort( ) function". The time between point 160 and point 162 is the reduction in the user-perceived latency. In other words the time between the system rendering output at point 160 in FIG. 1B and the system rendering output without the initial processing at point 106 in FIG. 1A.

Additionally or alternatively, in some implementations, the system can identify the NL input text of "How do I write a function to sort a list" as the predicted completion text at point 156 (i.e., the system does not process the NL input text using the language model and uses the NL input text directly as the predicted completion text). At point 156 the system can begin processing "How do I write a function to sort a list" using the generative model. At point 158, the system can confirm the predicted completion text of "How do I write a function to sort a list" and the system can continue processing the NL input text of "How do I write a function to sort a list" using the generative model. Additionally or alternatively, the system can render output of "To sort a list in C++ you can use the std::sort( ) function" at point 160.

Figure 2:
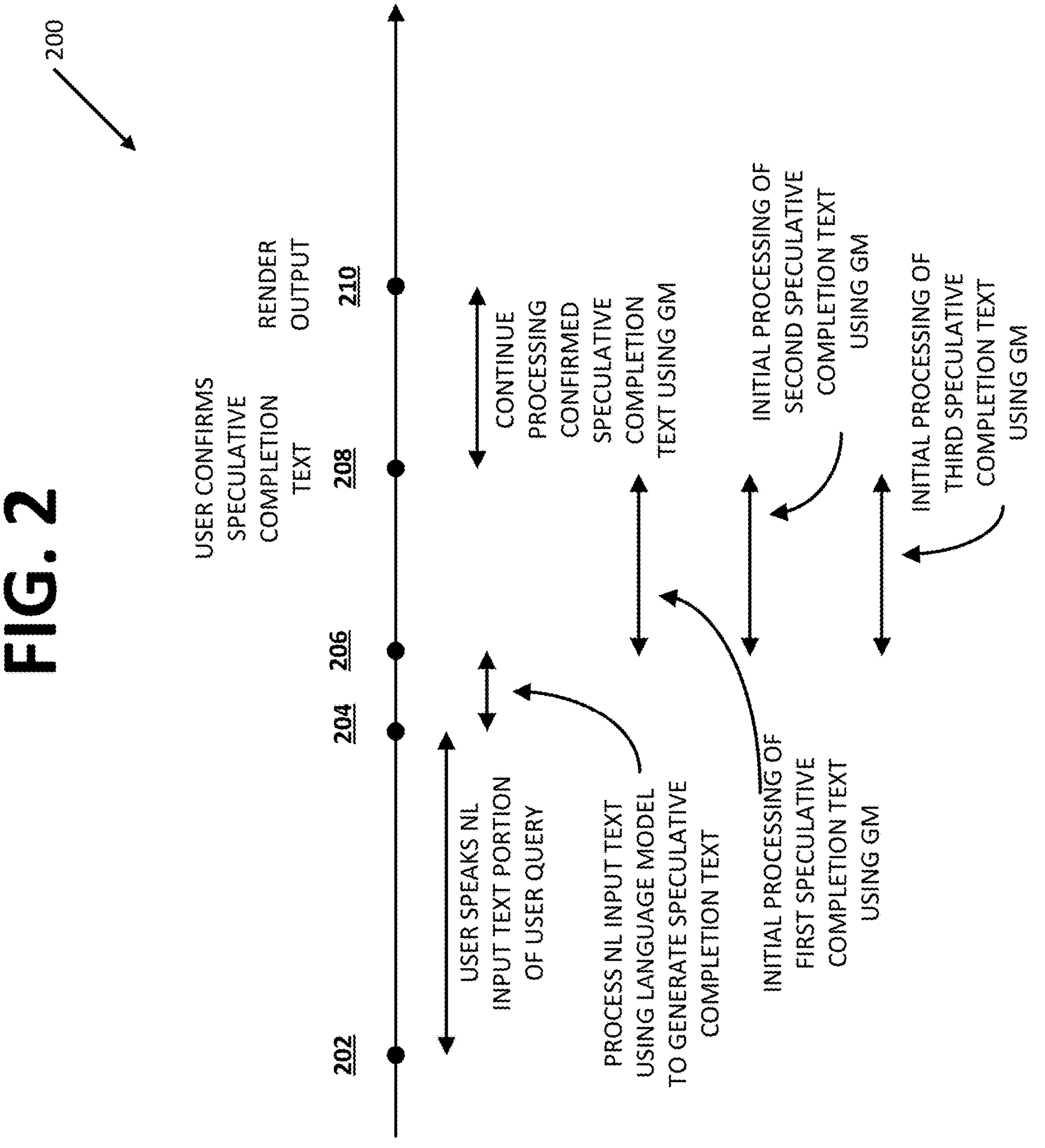
FIG. 2 illustrates another example of rendering output based on processing a user query in accordance with various implementations disclosed herein.

FIG. 2 illustrates an additional example of generating output based on processing user interface input using a generative model in accordance with various implementations. In the illustrated example 200, the user begins speaking a user query at point 202 and finishes at point 208 (not depicted). In some implementations, the user finishes speaking a NL input text portion of the user query at point 204. Additionally or alternatively, the system can begin processing the NL input text portion of the user query using a language model at point 204 to generate speculative completion text at point 206.

In some implementations, the system can generate multiple instances of speculative completion text, where each instance of speculative completion text and can perform initial processing of one or more of the instances of speculative completion text while waiting on confirmation of the speculative completion text from the user. For example, the system can perform initial processing of first speculative completion text using the generative model, initial processing of second speculative completion text using the generative model, and initial processing of third speculative completion text using the generative model. At point 208, the user can confirm selection of one of the speculative completion texts which completes the user query. The system can then continue processing the speculative completion text confirmed at point 208 using the generative model to generate output. At point 210, the system can render the output to the user.

For example, the user can begin speaking the user query of "How do I write a function to sort a list in C++" at point 202 and can finish speaking the user query at point 208 (not depicted). The user can speak the NL input text portion of the user query of "How do I write a function to sort a list in" at point 202 and can finish speaking the NL input text at point 204. The system can begin processing the NL input text of "How do I write a function to sort a list in" using the language model at point 204 and can generate three instances of speculative completion text at point 206. The system can perform initial processing of three instances of speculative completion text using the generative model, in parallel, from point 206 to point 208. For example, the system can initially process the first speculative completion text of "Python"; the second speculative completion text of "C++"; and the third speculative completion text of "Java".

At point 208, the user can confirm the speculative completion text of "C++". In some implementations, the system can confirm the speculative completion text based on the user providing the rest of the user query. Additionally or alternatively, the system can render the speculative completion text to the user, and the user can confirm the speculative completion text by selecting the instance of speculative completion text (e.g., selecting on a touch screen). After the user confirms the speculative completion text, the system can continue processing the user query (e.g., the NL input text+the confirmed completion text) using the generative model. The system can complete processing the user query using the generative model at point 210. In some implementations, at point 210, the system can render output generated based on processing the user query using the generative model.

While the examples illustrated in FIG. 1A, FIG. 1B, and FIG. 2 include processing a spoken user query, this is not meant to be limiting. Additional or alternative implementations can include a variety of user interface input such as spoken input, typed input, gesture input, one or more additional or alternative types of user interface input, and/or combinations thereof.

FIG. 3A-FIG. 3I illustrate example user interfaces in accordance with various implementations where the system processes NL input text of "How do I write a function to sort a list in" portion of a user query of "How do I write a function to sort a list in C++". In some implementations, the user can speak portion(s) of the user query, where audio data capturing the portion(s) of the user query can be captured via one or more microphones of a client device, and where a text representation of the portion(s) of the user query can be generated based on processing the audio data (e.g., processing the audio data using a speech recognition model to generate a text representation of the user query). Additionally or alternatively, the user can provide the user query to the system as text via one or more user interface input devices (e.g., a keyboard, a touch screen, sensor(s) capturing gestures, etc.).

Figure 3B:
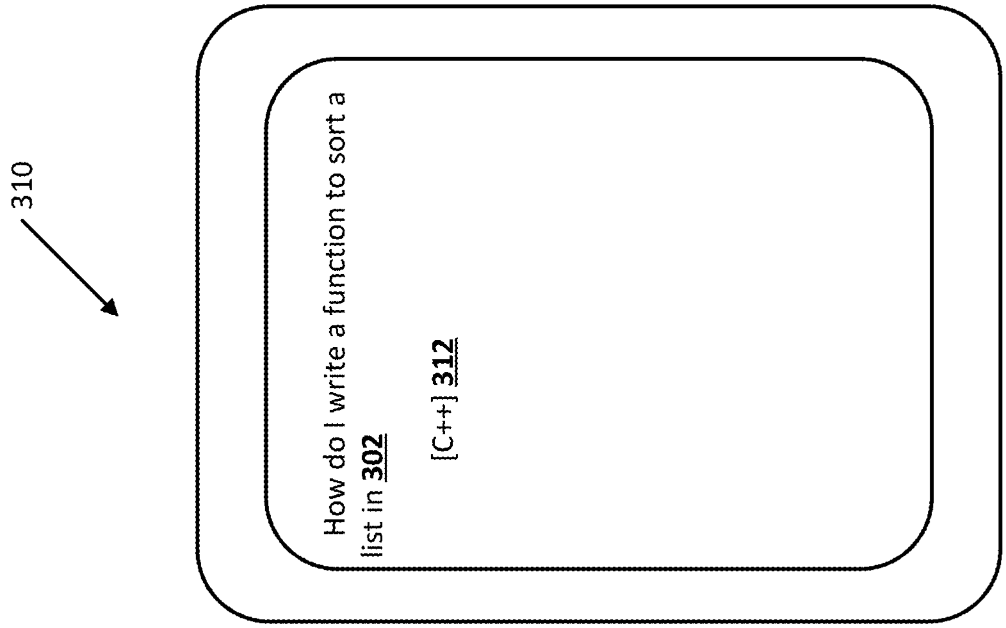
FIG. 3A, FIG. 3B, FIG. 3C, FIG. 3D, FIG. 3E, FIG. 3F, FIG. 3G, FIG. 3H, and FIG. 3I are examples of a user interface for rendering output based on processing a user query using a generative model in accordance with various implementations disclosed herein.
Figure 3A:
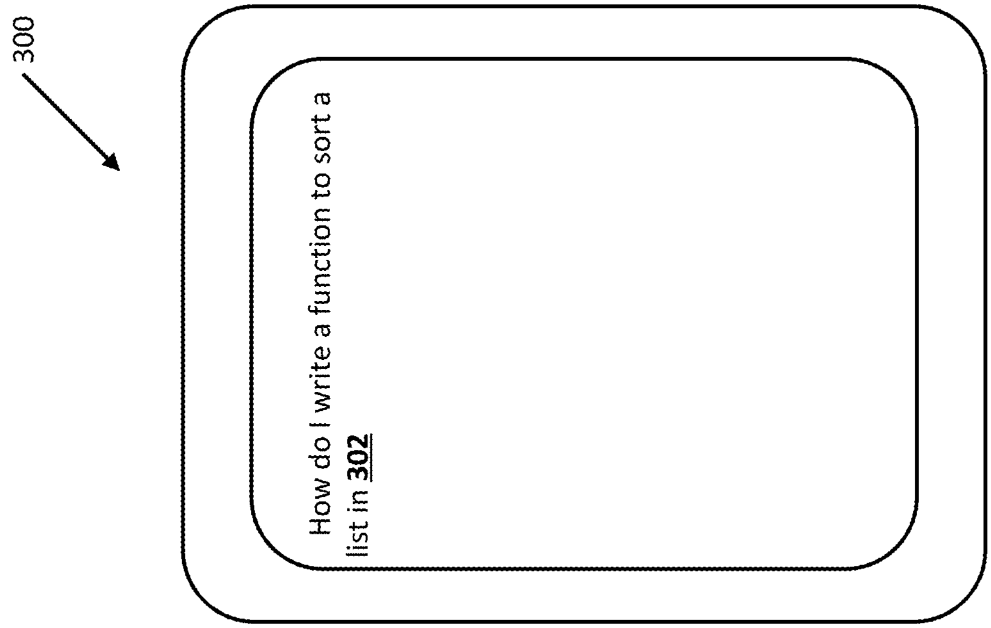
Figure 3D:
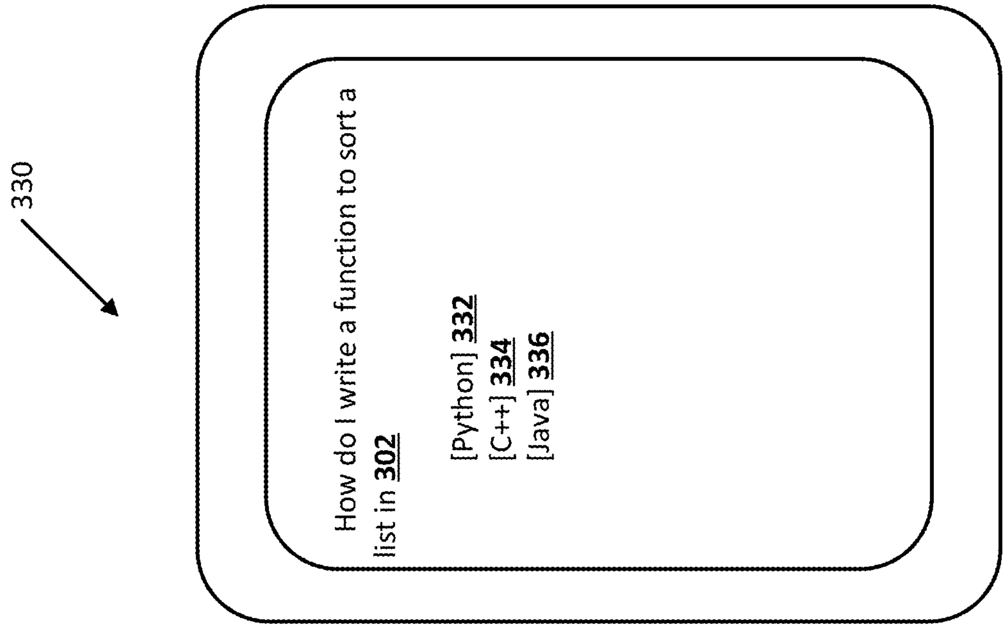

FIG. 3A includes example user interface 300 where a user has provided the NL input text 302 of "How do I write a function to sort a list in". In some implementations, the system can process the NL input text of "How do I write a function to sort a list in" using a language model to generate speculative completion text of "C++". In some implementations, the system can generate multiple instances of candidate completion text based on processing the NL input text using the language model. For example, the system can generate first speculative completion text of "Python", second candidate completion text of "C++", and third candidate completion text of "Java".

In some implementations, the system can select one or more of the candidate completion texts for initial processing using the generative model to generate output. Example user interface 310 in FIG. 3B includes output based on the speculative completion text of "[C++]" 312. However, in some implementations the system does not render output based on the speculative completion text to the user (not depicted). In some implementations, the user can confirm the speculative completion text by finishing speaking the user query. For example, the user can confirm the speculative completion text of "C++" by finishing speaking the user query of "How do I write a function to sort a list in C++". Additionally or alternatively, the user can confirm the speculative completion text by selecting a selectable element of "[C++]"312.

Figure 3C:
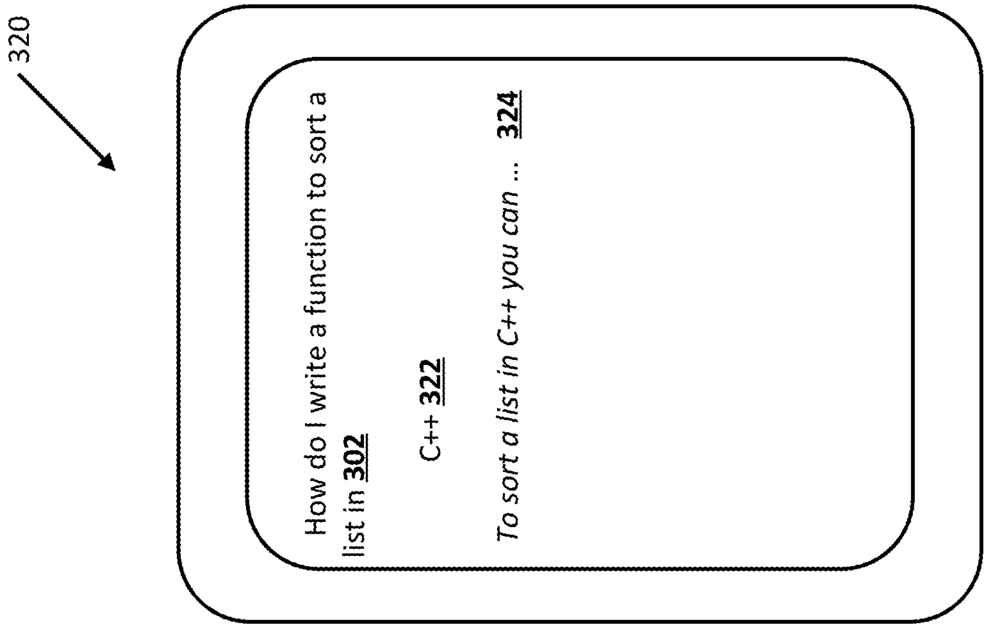

Example user interface 320 of FIG. 3C includes the NL input text 302 of "How do I write a function to sort a list in", the confirmed speculative completion text 322 of "C++", and the output generated based on initial processing of the NL input text and the speculative completion text using the generative model 324 of "To sort a list in C++ you can . . . ". In the illustrated example, the system can immediately render output based on the initial processing and can render additional output in a streaming manner. In some other implementations, the system can render all of the output once the system has completed processing the NL text input and the speculative completion text (e.g., the user query) using the generative model to generate the output.

In some implementations, the system can generate several instances of candidate completion text by processing the NL input text using the language model. Example user interface 330 of FIG. 3D includes the user provided NL input text 302 of "How do I write a function to sort a list in", a first speculative completion text 332 of "[Python]", a second speculative text 334 of "[C++]", and a third speculative completion text 336 of "[Java]". In some of those implementations, the user can confirm the second speculative completion text 334 of "[C++]".

Figure 3E:
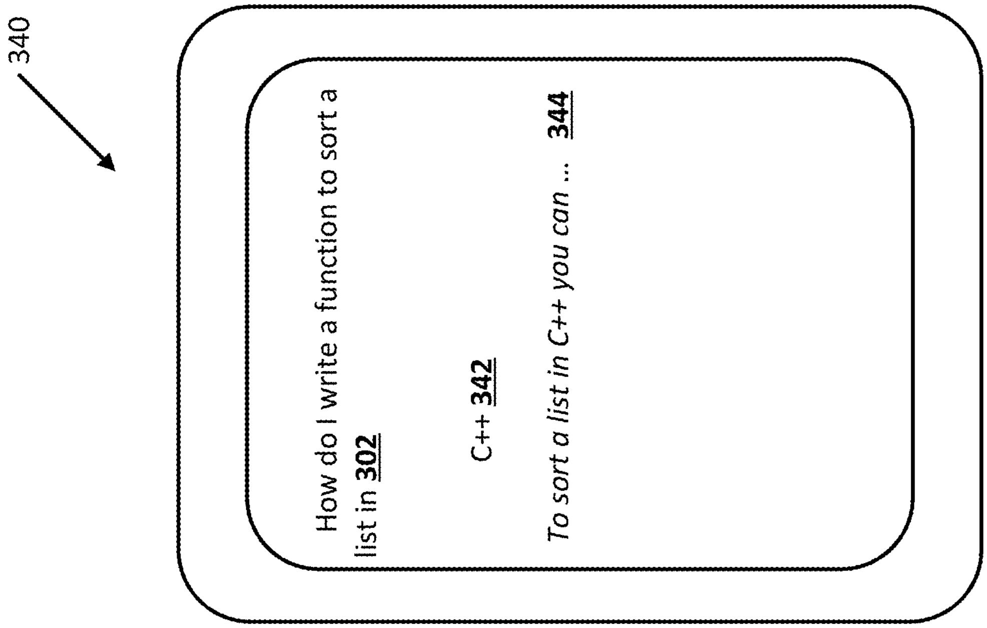

Example user interface 340 of FIG. 3E includes the NL input text 302 of "How do I write a function to sort a list in" and the user confirmed second speculative completion text 342 of "C++". In some implementations, the system can immediately render output based on the initial processing using the generative model of "To sort a list in C++ you can . . . " 344. In some of those implementations, the system can render the remaining output generated based on processing using the generative model in a streaming manner as the output becomes available.

Figure 3F:
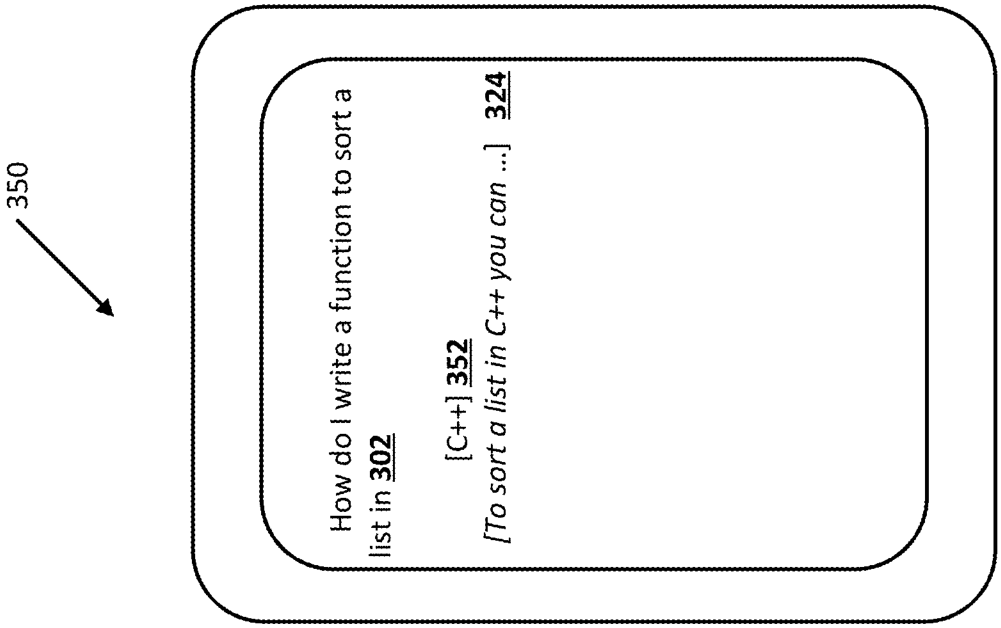
Figure 3G:
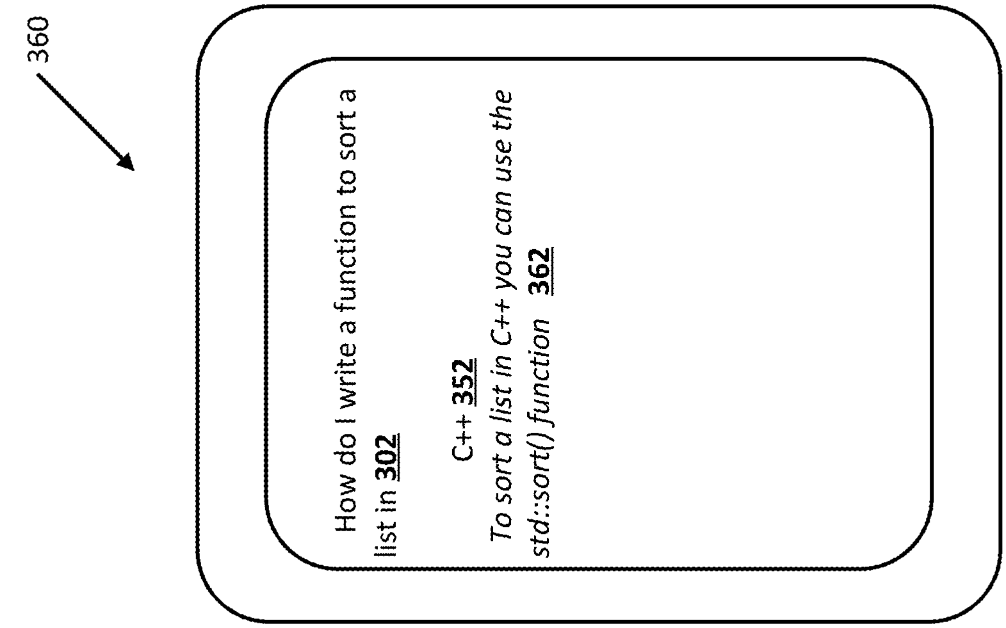

Example user interface 350 of FIG. 3F includes the NL input text 302 of "How do I write a function to sort a list in", predicted completion text 352 of "[C++]" and output generated based on initial processing of the NL input text 302 and predicted completion text 352 using the generative model of "[To sort a list in C++ you can . . . ]" 324. In some of those implementations, the output generated based on the initial processing can be rendered to the user to provide additional information for the user to confirm predicted completion text. In some implementations, the predicted completion text 352 is generated based on processing the NL input text 302 using the language model. Additionally or alternatively, the user can confirm the predicted completion text of "C++", and the system can continue processing the user query using the generative model to generate additional output. Example user interface 360 of FIG. 3G includes the NL input text 302 of "How do I write a function to sort a list in", confirmed predicted completion text 352 of "C++", and output generated based on continued processing of the NL input text and predicted completion text using the generative model of "To sort a list in C++ you can use the std::sort( ) function" 362.

Figure 3H:
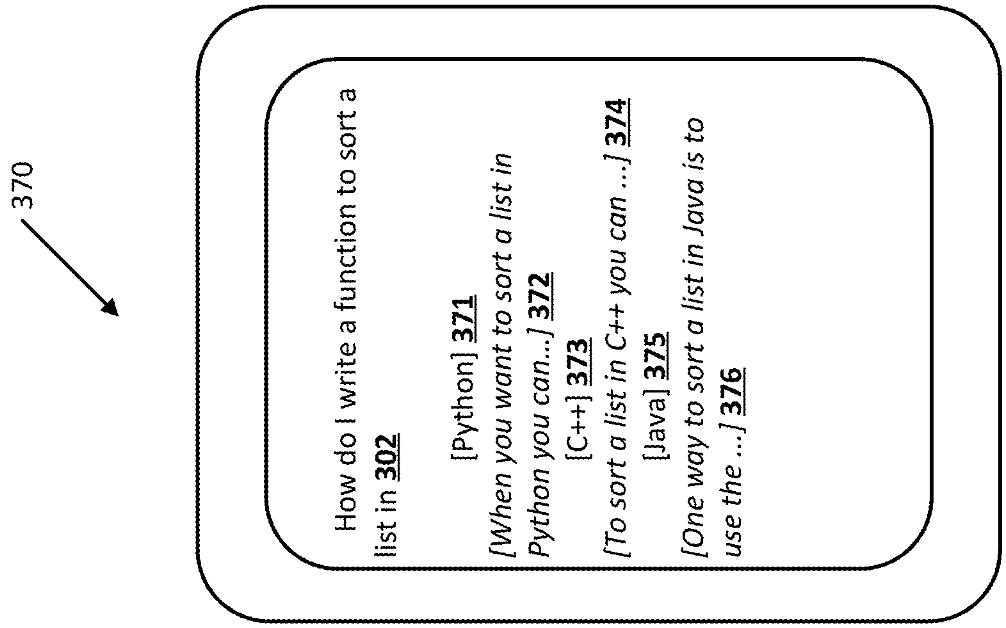
Figure 3I:
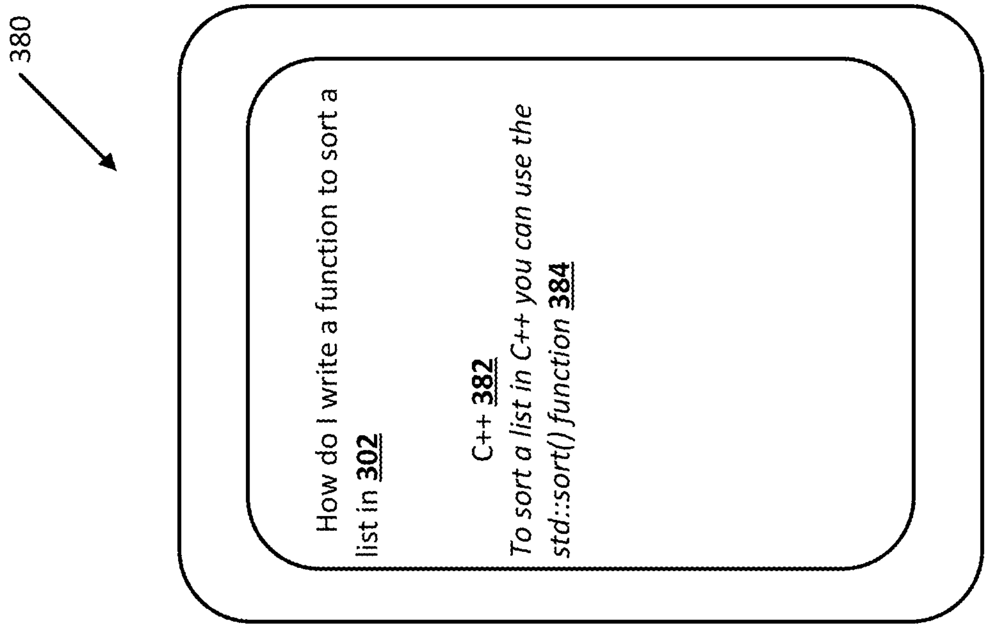

Example user interface 370 of FIG. 3H includes the NL input text 302 of "How do I write a function to sort a list in" as well as first predicted completion text 371 of "[Python]", second predicted completion text 373 of "[C++]", and third predicted completion text 375 of "[Java]". In some implementations, the predicted completion text 371, 373, and 375 can be generated based on processing the NL input text 302 using a language model. Additionally or alternatively, the system can initially process each of the instances of speculative completion text (e.g., in parallel) using the generative model to generate initial output corresponding to each of the instances of predicted completion text. The user interface 370 can additionally include the initial output 372 of "[When you want to sort a list in Python you can . . . ]" corresponding to the predicted completion text 371 of "[Python]"; the initial output 374 of "[To sort a list in C++ you can . . . ]" corresponding to the predicted completion text 373 of "[C++]"; and the initial output 376 of "[One way to sort a list in Java is to use the . . . ]" corresponding to the predicted completion text 375 of "[Java]".

In some implementations, the user can confirm one of the instances of predicted completion text 382 of "C++", and the system can continue processing the NL input text 302 and the predicted completion text using the generative model to generate additional output responsive to the user query. User interface 380 of FIG. 3I includes the NL input text 302 of "How do I write a function to sort a list" 302, the confirmed instance of predicted completion text 382 of "C++", and the output generated using the generative model 384 of "To sort a list in C++ you can use the std::sort( ) function".

The examples described in FIG. 3A-FIG. 3I are merely illustrative and not meant to be limiting. The system can process additional and/or alternative NL input text and/or user queries in accordance with various implementations.

Figure 4:
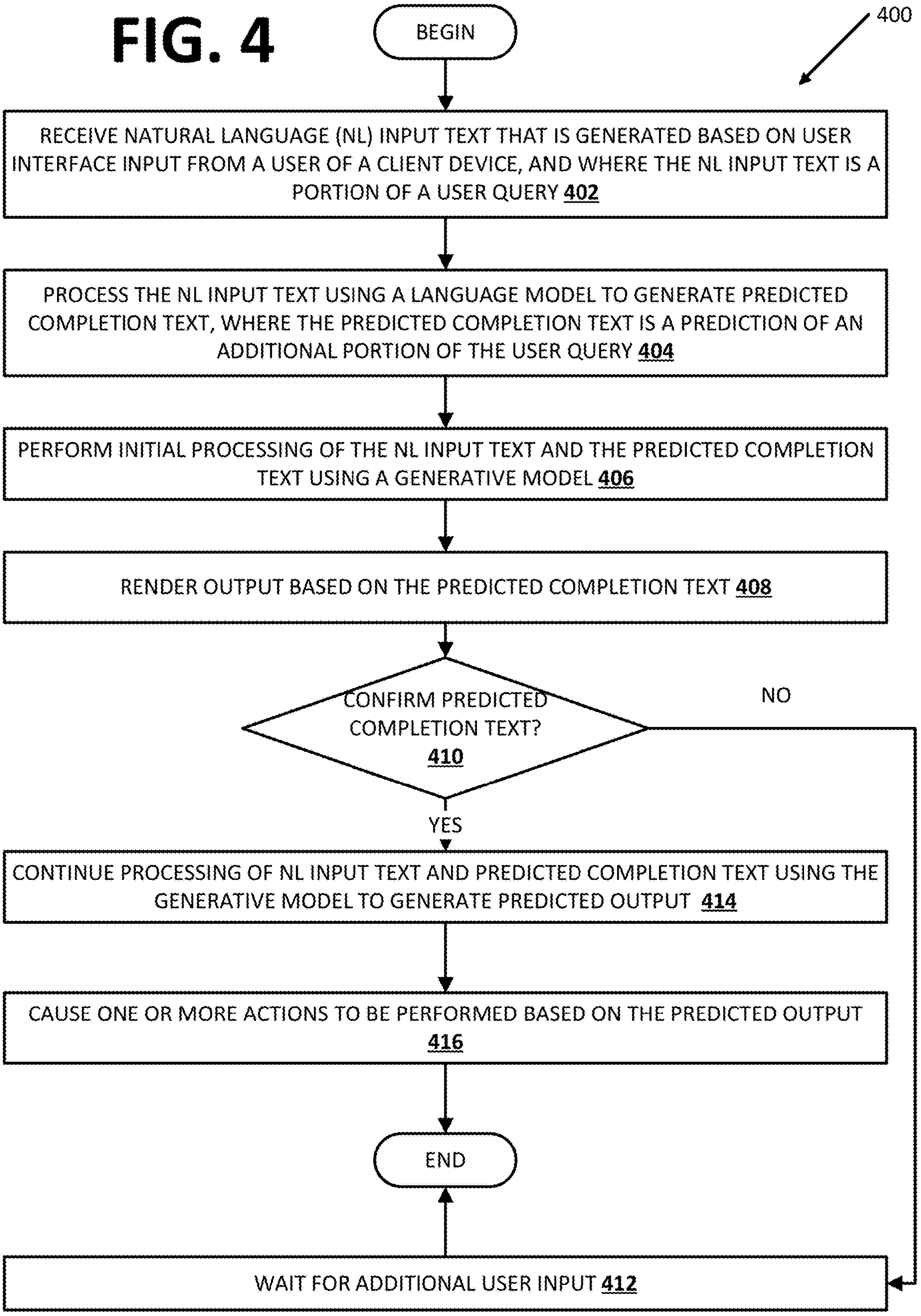
FIG. 4 is a flowchart illustrating an example process of generating predicted output based on processing natural language input text and predicted completion text using a generative model in accordance with various implementations disclosed herein.

FIG. 4 is a flowchart illustrating an example process 400 of generating predicted output based on processing natural language input text and predicted completion text using a generative model in accordance with various implementations disclosed herein. For convenience, the operations of the flowchart are described with reference to a system that performs the operations. This system may include various components of various computer systems, such as one or more components of computing system 702, client device 802, and/or computing system 910. Moreover, while operations of process 400 are shown in a particular order, this is not meant to be limiting. One or more operations may be reordered, omitted, and/or added.

At block 402, the system receives NL input text that is generated based on user interface input from a user of a client device. In some implementations, the NL input text is a portion of a user query. For example, the system can receive the NL input text of "How do I write a function to sort a list in" of the user query "How do I write a function to sort a list in C++" as described herein with respect to FIG. 3. In some implementations, the user interface input can include text input provided by a user of a client device. In some other implementations, the user interface input can include a spoken user query, where the system processes audio data capturing the spoken user query to generate a text representation of the user query.

At block 404, the system processes the NL input text using a language model to generate predicted completion text, where the predicted completion text is a prediction of an additional portion of the user query. In some implementations, the language model is the same model as the generative model used at step 406. In some other implementations, the language model is a distinct model from the generative model used at step 406. The language model can be personalized to a given user (e.g., to increase the accuracy of the predicted completion text generated using the language model). For example, the language model can be personalized for the given user based on one or more prior user queries, based on information stored in a user profile corresponding to the user, based on additional or alternative information, and/or combinations thereof. Information stored in a user profile corresponding to the given user can include (but is not limited to) contact information saved in an address book, one or more calendar entries, one or more documents, one or more media files, one or more emails, one or more client devices of the given user, one or more additional or alternative types of information, and/or combinations thereof.

At block 406, the system performs initial processing of the NL input text and the predicted completion text using a generative model. In some implementations, the system can initially process the NL input text and the predicted completion text using the generative model to generate a partial response to the user query. In some of those implementations, the system can perform a limited number of decoding steps (e.g., running the generative model where the system performs a small number of maximum decoding steps such as 50 tokens, 100 tokens, 500 tokens, etc.). In some versions of those implementations, by decoding a limited number of steps, the system can generate an initial portion of the response to the user query at a low computational resource cost (when compared with performing full inference with the generative model).

Additionally or alternatively, the system can initially process the NL input text and the predicted completion text to perform one or more lookups in a vector database based on the NL input text and the predicted completion. In some implementations, the system can run tokenization, embedding, encoder, pre-fill operations, and/or additional or alternative operations. In some other implementations, the system can perform tool use calls using the NL input text and predicted completion text (e.g., the user query) and cache those results to be used once the user confirms the user query.

At block 408, the system renders output based on the predicted completion text. In some implementations, the system can render one instance of predicted completion text for the user. For example, the system can render one instance of predicted completion text of "[C++]" as described above with respect to example 310 of FIG. 3B. In some other implementations, the system can render multiple instances of predicted completion text for the user. For example, the system can render the first instance of predicted completion text of "[Python]", the second instance of predicted completion text of "[C++]", and the third instance of predicted completion text of "[Java]" as described above with respect to example 330 of FIG. 3D.

Additionally or alternatively, the system can render output which includes one or more instances of predicted completion text and corresponding initial output (e.g., initial output generated based on processing the NL input text and the corresponding instance of predicted completion text using the generative model at block 406). For example, the system can render output based on the predicted completion text "[C++]" and the initial output "[To sort a list in C++ you can . . . ]" as described above with respect to example 350 of FIG. 3F. Similarly, the system can render output based on multiple instances of predicted completion text and corresponding initial output. For example, the system can render the first instance of predicted completion text of "[Python]" and corresponding initial output of "[When you want to sort a list in Python you can . . . ]"; the second instance of predicted completion text of "[C++]" and corresponding initial output of "[To sort a list in C++ you can . . . ]"; and the third instance of predicted completion text of "[Java]" and the corresponding initial output of "[One way to sort a list in Java is to use the . . . ]" as described herein with respect to example 370 of FIG. 3H.

At block 410, the system determines whether the user confirms the predicted completion text. In some implementations, the user can confirm the predicted completion text by providing the rest of the user query to the system. For example, the user can finish typing the user query and/or finish speaking the user query. The system can determine if the user confirms the predicted completion text based on comparing the completed user query with the NL input text and the predicted completion text, where the predicted completion text is confirmed when the NL input text+the predicted completion text is the same as the completed user query. Additionally or alternatively, the user can confirm the predicted completion text based on selecting the instance of predicted completion text via a user interface (e.g., select the predicted completion text via a selectable button of the user interface). If the system determines the user confirms the predicted completion text, the process proceeds to block 414. If the system determines the user does not confirm the predicted completion text, the process proceeds to block 412.

At block 412, the system waits for additional user input. In some implementations, the system, upon receiving additional user input, can generate an additional instance of NL input text (which includes the original instance of NL input text+the additional user input); process the additional instance of NL input text using the language model to generate additional predicted completion text; perform initial processing of the additional NL input text and the additional predicted completion text; render additional output based on the additional predicted completion text; and determine whether the user confirms the additional predicted completion text. In some other implementations, the system does not receive any additional user interface input, and the process ends. Additionally or alternatively, the process can end when the system determines the NL input text and the additional user interface input are a complete user query.

At block 414, the system continues processing of NL input text and predicted completion text using the generative model to generate predicted output. In some implementations, the system can continue generating output. Additionally or alternatively, the system can process the user query using the generative model using the vector database lookups, the tokenizations, the embeddings, the embeddings, and/or the pre-fill operations generated during initial processing.

At block 416, the system causes one or more actions to be performed based on the predicted output. The one or more actions include rendering output based on the predicted output, controlling one or more devices associated with the system (e.g., controlling a smart thermostat, controlling a light bulb, etc.), performing one or more additional or alternative actions, and/or combinations thereof.

Figure 5:
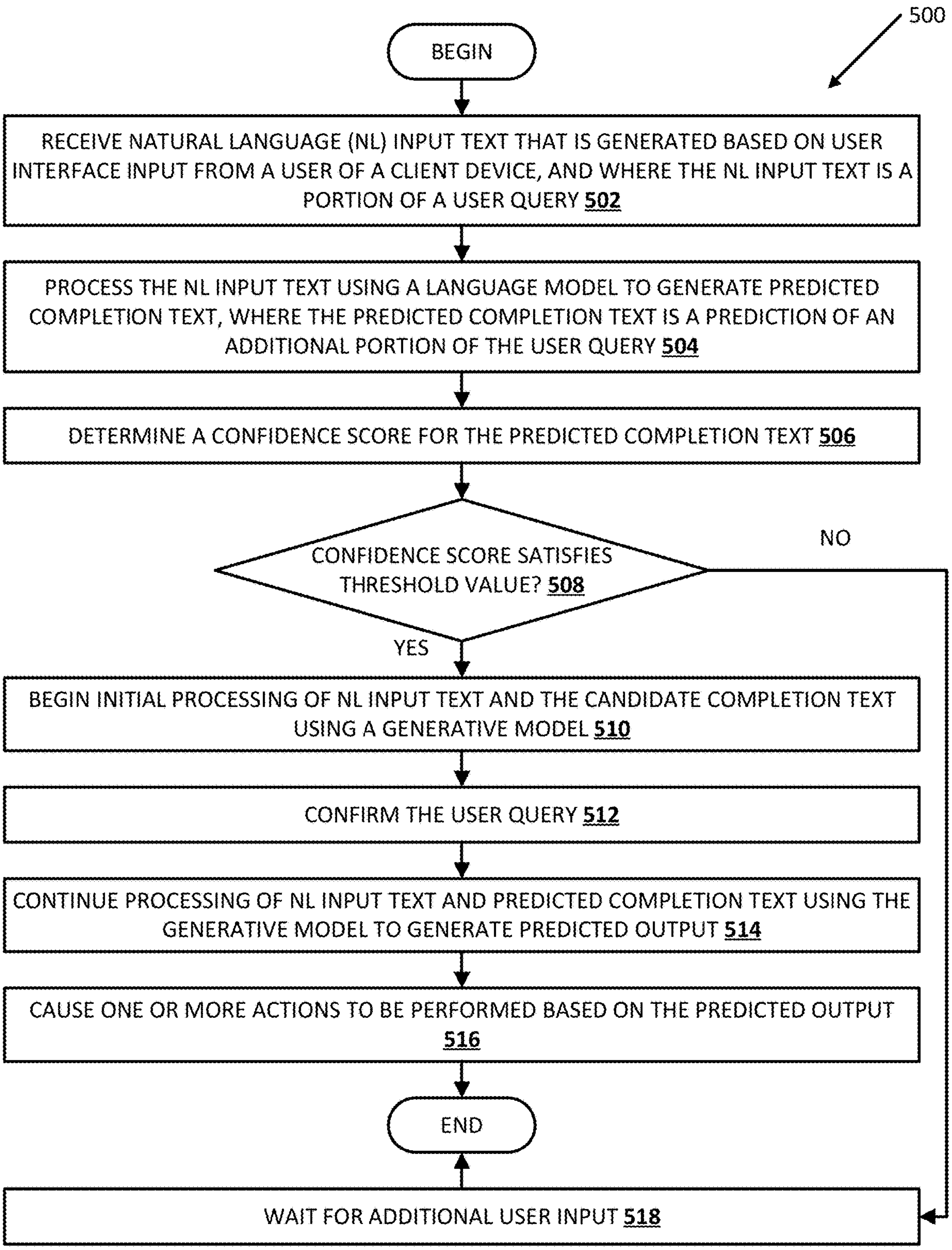
FIG. 5 is a flowchart illustrating an additional example of generating predicted output based on processing natural language input text and predicted completion text using a generative model in accordance with various implementations disclosed herein.

FIG. 5 is a flowchart illustrating an example process 500 of generating predicted output based on processing natural language input text and predicted completion text using a generative model in accordance with various implementations disclosed herein. For convenience, the operations of the flowchart are described with reference to a system that performs the operations. This system may include various components of various computer systems, such as one or more components of computing system 702, client device 802, and/or computing system 910. Moreover, while operations of process 500 are shown in a particular order, this is not meant to be limiting. One or more operations may be reordered, omitted, and/or added.

At block 502, the system receives NL input text that is generated based on user interface input from a user of a client device. In some implementations, the NL input text is a portion of a user query. In some implementations, the NL input text is a portion of a user query. For example, the system can receive the NL input text of "How do I write a function to sort a list in" of the user query "How do I write a function to sort a list in C++" as described herein with respect to FIG. 3. In some implementations, the user interface input can include text input provided by a user of a client device. In some other implementations, the user interface input can include a spoken user query, where the system processes audio data capturing the spoken user query to generate a text representation of the user query.

At block 504, the system processes the NL input text using a language model to generate predicted completion text, where the predicted completion text is a prediction of an additional portion of the user query. In some implementations, the language model is the same model as the generative model used at step 510. In some other implementations, the language model is a distinct model from the generative model used at step 510. The language model can be personalized to a given user (e.g., to increase the accuracy of the predicted completion text generated using the language model). For example, the language model can be personalized for the given user based on one or more prior user queries, based on information stored in a user profile corresponding to the user, based on additional or alternative information, and/or combinations thereof. Information stored in a user profile corresponding to the given user can include (but is not limited to) contact information saved in an address book, one or more calendar entries, one or more documents, one or more media files, one or more emails, one or more client devices of the given user, one or more additional or alternative types of information, and/or combinations thereof.

At block 506, the system determines a confidence score for the predicted completion text. In some implementations, the confidence score can be generated using the language model (e.g., the language model can generate predicted completion text and a corresponding confidence score). Additionally or alternatively, the predicted completion text can be processed using an additional model (e.g., a confidence score model) to generate a corresponding confidence score.

At block 508, the system determines whether the confidence score satisfies a threshold value. If the confidence score satisfies the threshold value, the process proceeds to block 510 and begins initial processing of the NL input text and the predicted completion text. If the confidence score does not satisfy the threshold value, the process proceeds to block 518 and waits for additional user input. In some implementations, the system can process the predicted completion text with the highest confidence score. In some other implementations, the system can determine to initially process predicted completion text when the corresponding confidence score satisfies a threshold value. In some further implementations, the system can determine to initially process predicted completion texts with the top-K corresponding confidence scores.

Additionally or alternatively, the system can determine whether to perform initial processing of one or more instances of predicted completion text based on the availability of computing resources (e.g., processor cycles, memory, power, etc.). For example, the system can determine to perform initial processing on fewer instances of predicted completion text when fewer computing resources are available. Similarly, the system can determine to perform initial processing on more instances (or all instances) of predicted completion text when more computing resources are available. In some implementations, the system can perform the initial processing of the NL input text and predicted completion text using the generative model at a remote server. When the server load is low, the system can perform initial processing of multiple instances of predicted completion text. In contrast, when the server load is high, the system can perform initial processing of only the instance of predicted completion text with the highest corresponding confidence score, only on instance(s) of predicted completion text which satisfy a threshold value, etc.

In some implementations, the system can determine whether to perform initial processing of predicted completion text based on whether a set of the instances of predicted completion text capture a threshold percentage of the probability distribution of predicted completion text. In some of those implementations, the system can determine to perform initial processing of predicted completion text that covers a threshold percentage of the probability distribution. For example, a system can have a threshold percentage of the probability distribution of 75%, where the system performs initial processing of predicted completion text that covers 75% of the probability distribution. In other words, the system can determine to not perform initial processing on additional predicted completion text when the system is performing initial processing of the majority of the probability distribution. In some implementations, the system can perform initial processing on the selected predicted completion text by processing the predicted completion text using the generative model to generate a partial response to the user query.

At block 510, the system begins initial processing of NL input text and the candidate completion text using a generative model. In some implementations, the system can initially process the NL input text and the predicted completion text using the generative model to generate a partial response to the user query. In some of those implementations, the system can perform a limited number of decoding steps (e.g., running the generative model where the system performs a small number of maximum decoding steps such as 50 tokens, 100 tokens, 500 tokens, etc.). In some versions of those implementations, by decoding a limited number of steps, the system can generate an initial portion of the response to the user query at a low computational resource cost (when compared with performing full inference with the generative model).

Additionally or alternatively, the system can initially process the NL input text and the predicted completion text to perform one or more lookups in a vector database based on the NL input text and the predicted completion. In some implementations, the system can run tokenization, embedding, encoder, pre-fill operations, and/or additional or alternative operations. In some other implementations, the system can perform tool use calls using the NL input text and predicted completion text (e.g., the user query) and cache those results to be used once the user confirms the user query.

At block 512, the system can confirm the user query. In some implementations, the user can confirm the predicted completion text by providing the rest of the user query to the system. For example, the user can finish typing the user query and/or finish speaking the user query. The system can determine the user confirms the predicted completion text based on comparing the completed user query with the NL input text and the predicted completion text, where the predicted completion text is confirmed when the NL input text+the predicted completion text is the same as the completed user query. Additionally or alternatively, the user can confirm the predicted completion text based on selecting the instance of predicted completion text via a user interface (e.g., select the predicted completion text via a selectable button of the user interface).

At block 514, the system can continue processing of NL input text and predicted completion text using the generative model to generate predicted output. In some implementations, the system can continue generating output. Additionally or alternatively, the system can process the user query using the generative model using the vector database lookups, the tokenizations, the embeddings, the embeddings, and/or the pre-fill operations generated during initial processing.

At block 516, the system causes one or more actions to be performed based on the predicted output. The one or more actions include rendering output based on the predicted output, controlling one or more devices associated with the system (e.g., controlling a smart thermostat, controlling a light bulb, etc.), performing one or more additional or alternative actions, and/or combinations thereof.

Figure 6:
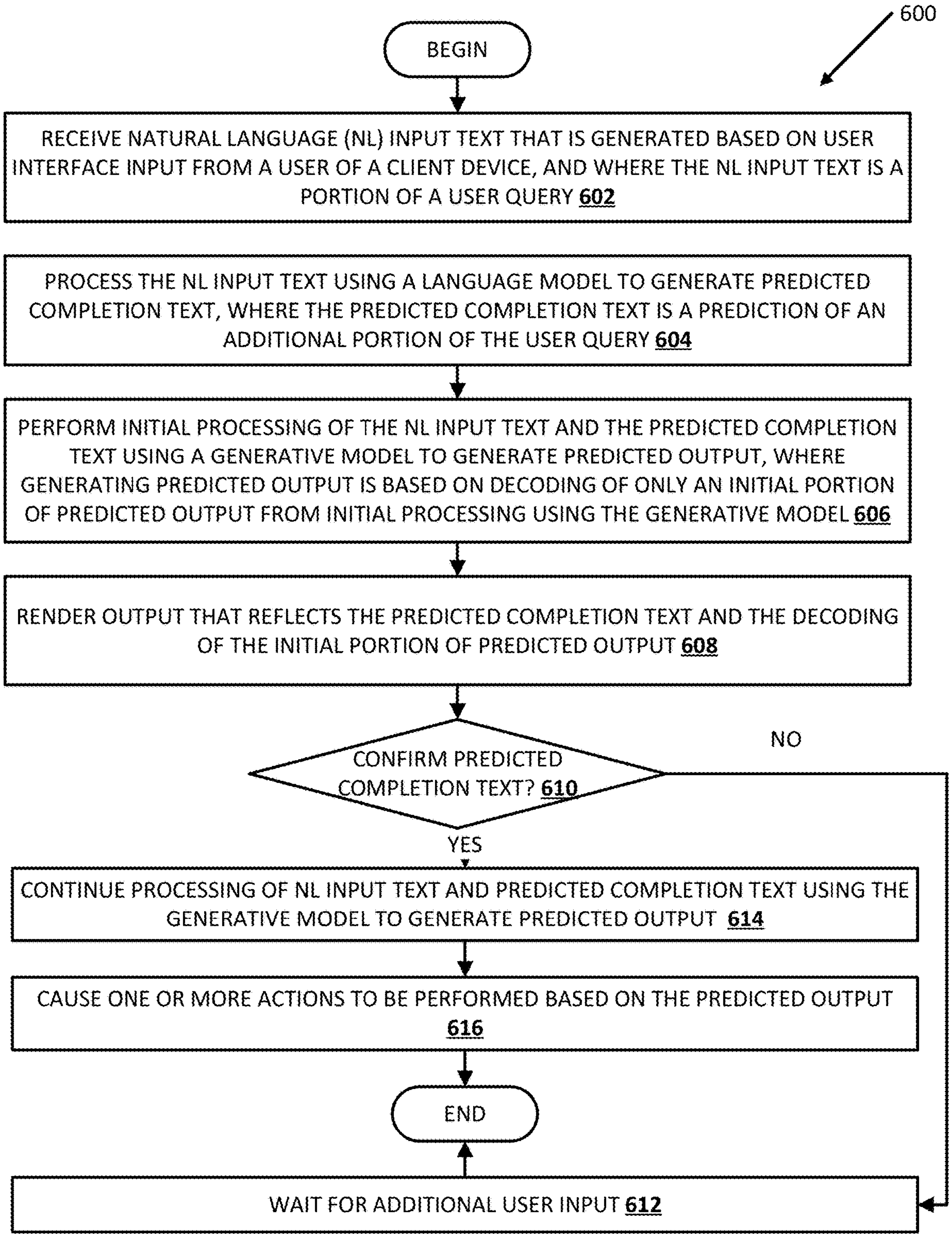
FIG. 6 is a flowchart illustrating an additional example of generating predicted output based on processing natural language input text and predicted completion text using a generative model in accordance with various implementations disclosed herein.

FIG. 6 is a flowchart illustrating an example process 600 of generating predicted output based on processing natural language input text and predicted completion text using a generative model in accordance with various implementations disclosed herein. For convenience, the operations of the flowchart are described with reference to a system that performs the operations. This system may include various components of various computer systems, such as one or more components of computing system 702, client device 802, and/or computing system 910. Moreover, while operations of process 600 are shown in a particular order, this is not meant to be limiting. One or more operations may be reordered, omitted, and/or added.

At block 602, the system receives NL input text that is generated based on user interface input from a user of a client device. In some implementations, the NL input text is a portion of a user query. In some implementations, the NL input text is a portion of a user query. For example, the system can receive the NL input text of "How do I write a function to sort a list in" of the user query "How do I write a function to sort a list in C++" as described herein with respect to FIG. 3. In some implementations, the user interface input can include text input provided by a user of a client device. In some other implementations, the user interface input can include a spoken user query, where the system processes audio data capturing the spoken user query to generate a text representation of the user query.

At block 604, the system processes the NL input text using a language model to generate predicted completion text, where the predicted completion text is a prediction of an additional portion of the user query. In some implementations, the language model is the same model as the generative model used at step 606. In some other implementations, the language model is a distinct model from the generative model used at step 606. The language model can be personalized to a given user (e.g., to increase the accuracy of the predicted completion text generated using the language model). For example, the language model can be personalized for the given user based on one or more prior user queries, based on information stored in a user profile corresponding to the user, based on additional or alternative information, and/or combinations thereof. Information stored in a user profile corresponding to the given user can include (but is not limited to) contact information saved in an address book, one or more calendar entries, one or more documents, one or more media files, one or more emails, one or more client devices of the given user, one or more additional or alternative types of information, and/or combinations thereof.

At block 606, the system performs initial processing of the NL input text and the predicted completion text using a generative model to generate predicted output. In some implementations, the system can initially process the NL input text and the predicted completion text using the generative model to generate a partial response to the user query. In some of those implementations, the system can perform a limited number of decoding steps (e.g., running the generative model where the system performs a small number of maximum decoding steps such as 50 tokens, 100 tokens, 500 tokens, etc.). In some versions of those implementations, by decoding a limited number of steps, the system can generate an initial portion of the response to the user query at a low computational resource cost (when compared with performing full inference with the generative model).

Additionally or alternatively, the system can initially process the NL input text and the predicted completion text to perform one or more lookups in a vector database based on the NL input text and the predicted completion. In some implementations, the system can run tokenization, embedding, encoder, pre-fill operations, and/or additional or alternative operations. In some other implementations, the system can perform tool use calls using the NL input text and predicted completion text (e.g., the user query) and cache those results to be used once the user confirms the user query.

At block 608, the system renders output that reflects the predicted completion text and the decoding of the initial portion of the predicted output. For example, the system can render output based on the predicted completion text "[C++]" and the initial output "[To sort a list in C++ you can . . . ]" as described above with respect to example 350 of FIG. 3F. Similarly, the system can render output based on multiple instances of predicted completion text and corresponding initial output. For example, the system can render the first instance of predicted completion text of "[Python]" and corresponding initial output of "[When you want to sort a list in Python you can . . . ]"; the second instance of predicted completion text of "[C++]" and corresponding initial output of "[To sort a list in C++ you can . . . ]"; and the third instance of predicted completion text of "[Java]" and the corresponding initial output of "[One way to sort a list in Java is to use the . . . ]" as described herein with respect to example 370 of FIG. 3H.

At block 610, the system determines whether the user confirms the predicted completion text. In some implementations, the user can confirm the predicted completion text by providing the rest of the user query to the system. For example, the user can finish typing the user query and/or finish speaking the user query. The system can determine if the user confirms the predicted completion text based on comparing the completed user query with the NL input text and the predicted completion text, where the predicted completion text is confirmed when the NL input text+the predicted completion text is the same as the completed user query. Additionally or alternatively, the user can confirm the predicted completion text based on selecting the instance of predicted completion text via a user interface (e.g., select the predicted completion text via a selectable button of the user interface). If the system determines the user confirms the predicted completion text, the process proceeds to block 614. If the system determines the user does not confirm the predicted completion text, the process proceeds to block 612.

At block 614, the system continues processing of the NL input text using the generative model to generate predicted output. In some implementations, the system can continue generating output. Additionally or alternatively, the system can process the user query using the generative model using the vector database lookups, the tokenizations, the embeddings, the embeddings, and/or the pre-fill operations generated during initial processing.

At block 616, the system causes one or more actions to be performed based on the predicted output. The one or more actions include rendering output based on the predicted output, controlling one or more devices associated with the system (e.g., controlling a smart thermostat, controlling a light bulb, etc.), performing one or more additional or alternative actions, and/or combinations thereof.

Figure 7:
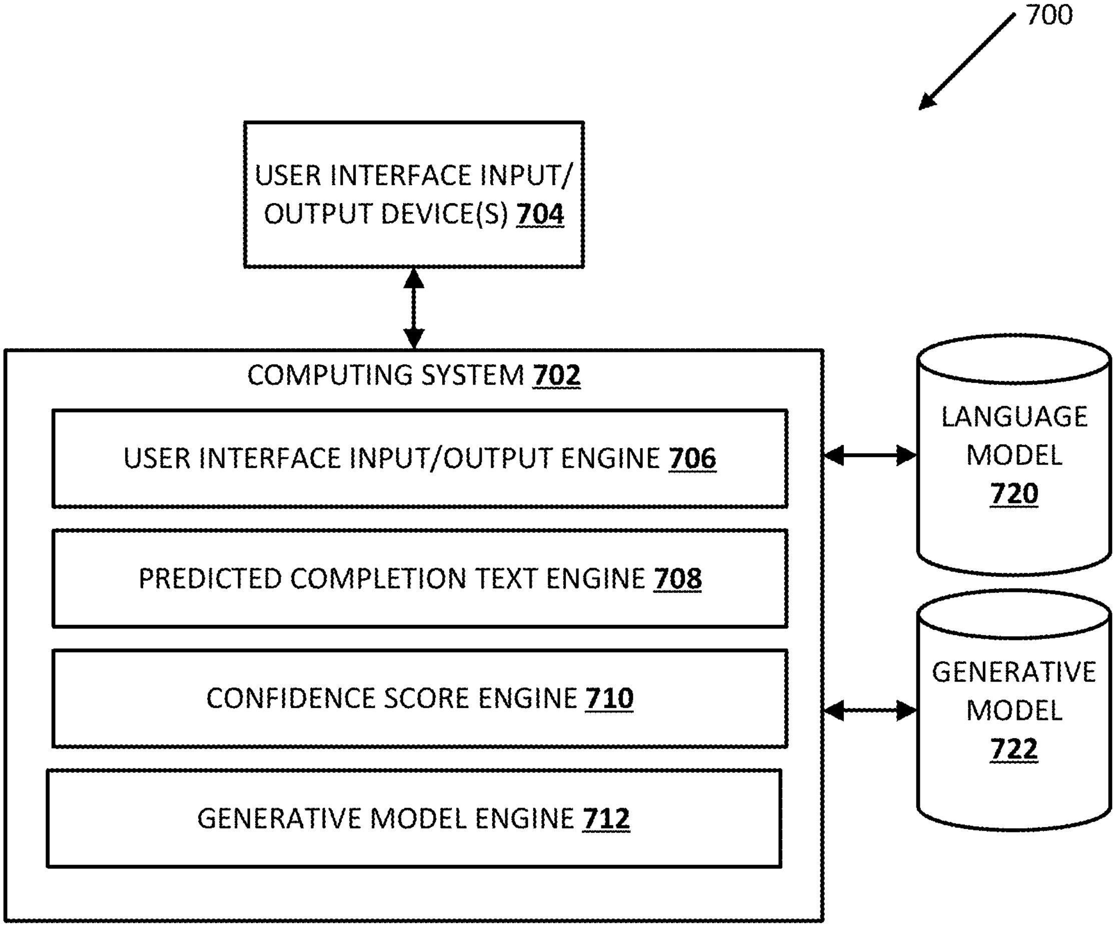
FIG. 7 illustrates an example environment in which various implementations described herein may be implemented.

FIG. 7 illustrates a block diagram of an example environment 700 in which various implementations may be implemented. The example environment 700 includes a computing system 702 which can include a user interface input/output engine 706, predicted completion text engine 708, confidence score engine 710, generative model engine 712, one or more additional or alternative engines (not depicted), and/or combinations thereof. Additionally or alternatively, computing system 702 may be associated with language model 720, generative model 722, one or more additional or alternative models (not depicted), and/or one or more additional or alternative components (not depicted).

In some implementations, computing system 702 may include user interface input/output devices 704, which may include, for example, a physical keyboard, a touch screen (e.g., implementing a virtual keyboard or other textual input mechanisms), a microphone, a camera, a display screen, and/or speaker(s). Additionally or alternatively, computing system 602 can include a variety of sensors (not depicted) such as an accelerometer, a gyroscope, a Global Positioning System (GPS), a pressure sensor, a light sensor, a distance sensor, a proximity sensor, a temperature sensor, one or more additional sensors, and/or combinations thereof. The user interface input/output devices 704 may be incorporated with one or more client devices of a user. For example, a mobile phone of the user may include the user interface input output devices; a standalone digital assistant hardware device may include the user interface input/output device; a first computing device may include the user interface input device(s) and a separate computing device may include the user interface output device(s); etc. In some implementations, all or aspects of computing system 702 may be implemented on a computing system that also contains the user interface input/output devices 704.

In some implementations computing system 702 may include an automated assistant (not depicted), and all or aspects of the automated assistant may be implemented on computing device(s) that are separate and remote from the client device that contains the user interface input/output devices (e.g., all or aspects may be implemented "in the cloud"). In some of those implementations, those aspects of the automated assistant may communicate with the computing device via one or more networks such as a local area network (LAN) and/or a wide area network (WAN) (e.g., the Internet).

Some non-limiting examples of a client device associated with computing system 702 include one or more of: a desktop computing device, a laptop computing device, a standalone hardware device at least in part dedicated to an automated assistant, a tablet computing device, a mobile phone computing device, a computing device of a vehicle (e.g., an in-vehicle communications system, and in-vehicle entertainment system, an in-vehicle navigation system, an in-vehicle navigation system), or a wearable apparatus of the user that includes a computing device (e.g., a watch of the user having a computing device, glasses of the user having a computing device, a virtual or augmented reality computing device). Additional and/or alternative computing systems may be provided. Computing system 702 may include one or more memories for storage of data and software applications, one or more processors for accessing data and executing applications, and other components that facilitate communication over a network. The operations performed by computing system 702 may be distributed across multiple computing devices. For example, computing programs running on one or more computers in one or more locations can be coupled to each other through a network.

In some implementations, user interface input/output engine 706 can process user interface input and/or generate user interface output. For instance, the user interface input/output engine 706 can process natural language text input from a user of a client device and/or audio data capturing a spoken utterance from a user of a client device. Additionally or alternatively, user interface input/output engine 706 can render output based on predicted completion text, initial output generated based on processing the NL text input and the predicted completion text using generative model 722, remaining output generated based on processing NL text input and confirmed predicted completion text using generative model 772, one or more additional or alternative user interface output, and/or combinations thereof.

In some implementations, predicted completion text engine 708 can process NL input text using the language model 720, and/or the generative model 722 to generate one or more instances of predicted completion text. For example, the system can generate predicted completion text based on processing NL input text in accordance with block 404 of process 400 described herein with respect to FIG. 4. Additionally or alternatively, in some implementations, the In some implementations, confidence score engine 710 can process one or more instances of predicted completion text to generate corresponding confidence scores. In some of those implementations, the system can process predicted completion text using confidence score engine 710 in accordance with block 506 of process 500 described herein with respect to FIG. 5. Additionally or alternatively, confidence score engine 710 can determine, based on the corresponding confidence score, whether to perform initial processing on the predicted completion text. For example, the system can process the predicted completion text and corresponding confidence scores using confidence score engine 710 to determine whether to perform initial processing of the predicted completion text in accordance with block 508 of process 500 described herein with respect to FIG. 5.

In some implementations, generative model engine 712 can perform initial processing of NL input text and predicted completion text. For instance, generative model engine 712 can perform initial processing of NL input text and predicted completion text in accordance with block 406 of processing 400 described herein with respect to FIG. 4. Additionally or alternatively, generative model engine 712 can continue processing the NL input text and predicted completion text to generate output once the user has confirmed the predicted completion text. For example, the generative model engine 712 can continue processing the NL input text and predicted completion text in accordance with block 414 of process 400 as described herein with respect to FIG. 4.

In some implementations, the language model 720 can be stored in a first portion of memory and the generative mode 722 can be stored in a second portion of memory, where the first portion of memory is smaller than the second portion (e.g., the first portion of memory is 75% smaller than the second portion of memory, the first portion of memory is 50% smaller than the second portion of memory, etc.). Additionally or alternatively, the language model 720 can have a first quantity of parameters (e.g., weights, biases, etc.) and the generative model 722 can have a second quantity of parameters, where the first quantity of parameters is smaller than the second quantity of parameters (e.g., the language model has 25% fewer parameters than the generative model; the language model has 50% fewer parameters than the generative model; the language model has 75% fewer parameters than the generative model; etc.). The utilization of computing resources (e.g., memory, processor cycles, power, etc.) is reduced when the predicted completion text is processed using the language model 720 compared to processing the predicted completion text with the larger generative model 722.

In some implementations, the language model 720 is stored locally at a client device while the generative model 722 is stored remotely from the client device (e.g., the language model 720 is stored locally on a mobile phone and the generative model 722 is stored on a remote server accessible by the mobile phone). In some versions of those implementations, latency is further reduced by enabling the client device to quickly generate predicted completion text locally at the client device and/or quickly render output based on the predicted completion text to the user. In contrast, when the language model is stored remotely at a server (e.g., remote from the client device), the system must transmit the NL input text to the server, process the NL input text using the language model at the server to generate predicted completion text output, and/or transmit the predicted completion text output from the server to the client device, before the system can render output to the user based on the predicted completion text.

Figure 8:
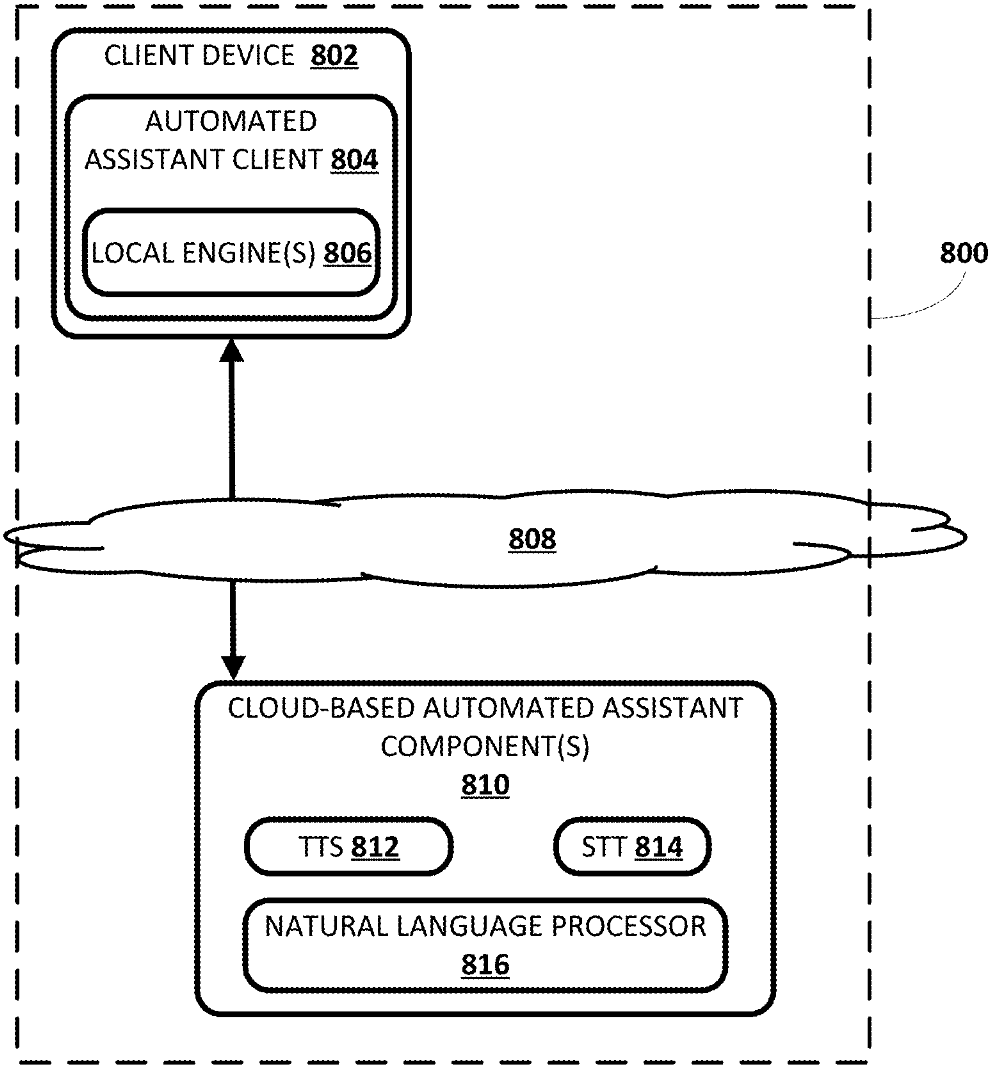
FIG. 8 illustrates another example environment in which various implementations disclosed herein may be implemented.

Turning now to FIG. 8, an example environment is illustrated where various implementations can be performed. FIG. 8 is described initially, and includes a client computing device 802, which executes an instance of an automated assistant client 804. One or more cloud-based automated assistant components 810 can be implemented on one or more computing systems (collectively referred to as a "cloud" computing system) that are communicatively coupled to client device 802 via one or more local and/or wide area networks (e.g., the Internet) indicated generally at 808.

An instance of an automated assistant client 804, by way of its interactions with one or more cloud-based automated assistant components 810, may form what appears to be, from the user's perspective, a logical instance of an automated assistant 800 with which the user may engage in a human-to-computer dialog. An instance of such an automated assistant 800 is depicted in FIG. 8. It thus should be understood that in some implementations, a user that engages with an automated assistant client 804 executing on client device 802 may, in effect, engage with his or her own logical instance of an automated assistant 800. For the sake of brevity and simplicity, the term "automated assistant" as used herein as "serving" a particular user will often refer to the combination of an automated assistant client 804 executing on a client device 802 operated by the user and one or more cloud-based automated assistant components 810 (which may be shared amongst multiple automated assistant clients of multiple client computing devices). It should also be understood that in some implementations, automated assistant 800 may respond to a request from any user regardless of whether the user is actually "served" by that particular instance of automated assistant 800.

The client computing device 802 may be, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television, and/or a wearable apparatus of the user that includes a computing device (e.g., a watch of the user having a computing device, glasses of the user having a computing device, a virtual or augmented reality computing device). Additional and/or alternative client computing devices may be provided. In various implementations, the client computing device 802 may optionally operate one or more other applications that are in addition to automated assistant client 804, such as a message exchange client (e.g., SMS, MMS, online chat), a browser, and so forth. In some of those various implementations, one or more of the other applications can optionally interface (e.g., via an application programming interface) with the automated assistant 800, or include their own instance of an automated assistant application (that may also interface with the cloud-based automated assistant component(s) 810).

Automated assistant 800 engages in human-to-computer dialog sessions with a user via user interface input and output devices of the client device 802. To preserve user privacy and/or to conserve resources, in many situations a user must often explicitly invoke the automated assistant 800 before the automated assistant will fully process a spoken utterance. The explicit invocation of the automated assistant 800 can occur in response to certain user interface input received at the client device 802. For example, user interface inputs that can invoke the automated assistant 800 via the client device 802 can optionally include actuations of a hardware and/or virtual button of the client device 802. Moreover, the automated assistant client can include one or more local engines 806, such as an invocation engine that is operable to detect the presence of one or more spoken invocation phrases. The invocation engine can invoke the automated assistant 800 in response to detection of one of the spoken invocation phrases. For example, the invocation engine can invoke the automated assistant 800 in response to detecting a spoken invocation phrase such as "Hey Assistant," "OK Assistant", and/or "Assistant". The invocation engine can continuously process (e.g., if not in an "inactive" mode) a stream of audio data frames that are based on output from one or more microphones of the client device 802, to monitor for an occurrence of a spoken invocation phrase. While monitoring for the occurrence of the spoken invocation phrase, the invocation engine discards (e.g., after temporary storage in a buffer) any audio data frames that do not include the spoken invocation phrase. However, when the invocation engine detects an occurrence of a spoken invocation phrase in processed audio data frames, the invocation engine can invoke the automated assistant 800. As used herein, "invoking" the automated assistant 800 can include causing one or more previously inactive functions of the automated assistant 800 to be activated. For example, invoking the automated assistant 800 can include causing one or more local engines 806 and/or cloud-based automated assistant components 810 to further process audio data frames based on which the invocation phrase was detected, and/or one or more following audio data frames (whereas prior to invoking no further processing of audio data frames was occurring).

The one or more local engine(s) 806 of automated assistant 800 are optional, and can include, for example, user interface input/output engine 702, user query engine 708, NL input text engine 710, predicted completion text engine 712, confidence score engine 714, generative model engine 716, and/or initial processing engine 718 described above, a local voice-to-text ("STT") engine (that converts captured audio to text), a local text-to-speech ("TTS") engine (that converts text to speech), a local natural language processor (that determines semantic meaning of audio and/or text converted from audio), and/or other local components. Because the client device 802 is relatively constrained in terms of computing resources (e.g., processor cycles, memory, battery, etc.), the local engines 806 may have limited functionality relative to any counterparts that are included in cloud-based automated assistant components 810.

Cloud-based automated assistant components 810 leverage the virtually limitless resources of the cloud to perform more robust and/or more accurate processing of audio data, and/or other user interface input, relative to any counterparts of the local engine(s) 806. Again, in various implementations, the client device 802 can provide audio data and/or other data to the cloud-based automated assistant components 810 in response to the invocation engine detecting a spoken invocation phrase, or detecting some other explicit invocation of the automated assistant 800.

The illustrated cloud-based automated assistant components 810 include a cloud-based TTS module 812, a cloud-based STT module 814, a natural language processor 816, a dialog state tracker 818, and a dialog manager 820. In some implementations, one or more of the engines and/or modules of automated assistant 800 may be omitted, combined, and/or implemented in a component that is separate from automated assistant 800. Further, in some implementations automated assistant 800 can include additional and/or alternative engines and/or modules. Cloud-based STT module 814 can convert audio data into text, which may then be provided to natural language processor 816.

Cloud-based TTS module 812 can convert textual data (e.g., natural language responses formulated by automated assistant 800) into computer-generated speech output. In some implementations, TTS module 812 may provide the computer-generated speech output to client device 802 to be output directly, e.g., using one or more speakers. In other implementations, textual data (e.g., natural language responses) generated by automated assistant 800 may be provided to one of the local engine(s) 806, which may then convert the textual data into computer-generated speech that is output locally.

Natural language processor 816 of automated assistant 800 processes free form natural language input and generates, based on the natural language input, annotated output for use by one or more other components of the automated assistant 800. For example, the natural language processor 816 can process natural language free-form input that is textual input that is a conversion, by STT module 814, of audio data provided by a user via client device 802. The generated annotated output may include one or more annotations of the natural language input and optionally one or more (e.g., all) of the terms of the natural language input.

In some implementations, the natural language processor 816 is configured to identify and annotate various types of grammatical information in natural language input. In some implementations, the natural language processor 816 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, the natural language processor 816 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there." In some implementations, one or more components of the natural language processor 816 may rely on annotations from one or more other components of the natural language processor 816. In some implementations, in processing a particular natural language input, one or more components of the natural language processor 816 may use related prior input and/or other related data outside of the particular natural language input to determine one or more annotations.

In some implementations, dialog state tracker 818 may be configured to keep track of a "dialog state" that includes, for instance, a belief state of a one or more users'goals (or "intents") over the course of a human-to-computer dialog session and/or across multiple dialog sessions. In determining a dialog state, some dialog state trackers may seek to determine, based on user and system utterances in a dialog session, the most likely value(s) for slot(s) that are instantiated in the dialog. Some techniques utilize a fixed ontology that defines a set of slots and the set of values associated with those slots. Some techniques additionally or alternatively may be tailored to individual slots and/or domains. For example, some techniques may require training a model for each slot type in each domain.

Dialog manager 820 may be configured to map a current dialog state, e.g., provided by dialog state tracker 818, to one or more "responsive actions" of a plurality of candidate responsive actions that are then performed by automated assistant 800. Responsive actions may come in a variety of forms, depending on the current dialog state. For example, initial and midstream dialog states that correspond to turns of a dialog session that occur prior to a last turn (e.g., when the ultimate user-desired task is performed) may be mapped to various responsive actions that include automated assistant 800 outputting additional natural language dialog. This responsive dialog may include, for instance, requests that the user provide parameters for some action (i.e., fill slots) that dialog state tracker 818 believes the user intends to perform. In some implementations, responsive actions may include actions such as "request" (e.g., seek parameters for slot filling), "offer" (e.g., suggest an action or course of action for the user), "select," "inform" (e.g., provide the user with requested information), "no match" (e.g., notify the user that the user's last input is not understood), a command to a peripheral device (e.g., to turn off a light bulb), and so forth.

Figure 9:
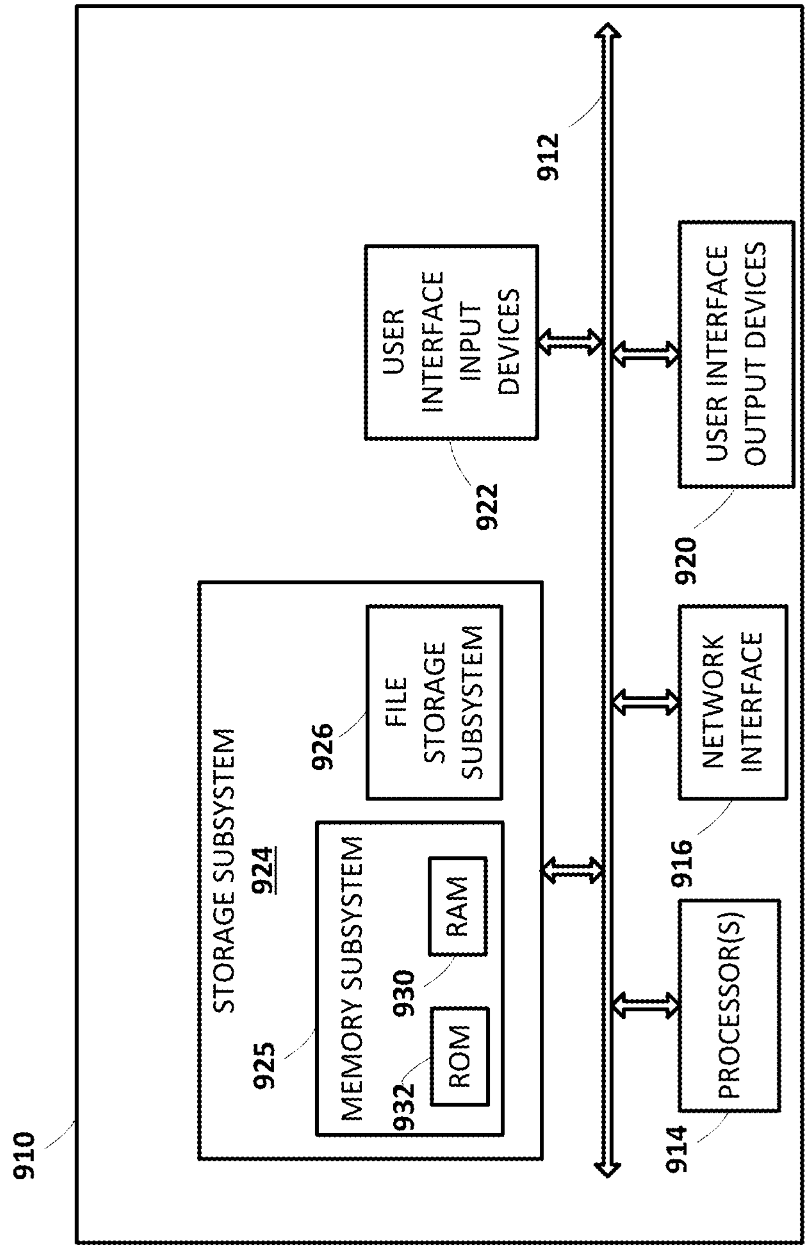
FIG. 9 illustrates an example architecture of a computing device.

FIG. 9 is a block diagram of an example computing device 910 that may optionally be utilized to perform one or more aspects of techniques described herein. In some implementations, one or more of a client computing device, and/or other component(s) may comprise one or more components of the example computing device 910.

Computing device 910 typically includes at least one processor 914 which communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 916. The input and output devices allow user interaction with computing device 910. Network interface subsystem 916 provides an interface to outside networks and is coupled to corresponding interface devices in other computing devices.

User interface input devices 922 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 910 or onto a communication network.

User interface output devices 920 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 910 to the user or to another machine or computing device.

Storage subsystem 924 stores programming and data constructs that provide the functionality of some or all of the modules described herein. For example, the storage subsystem 924 may include the logic to perform selected aspects of one or more of the processes of FIG. 4, FIG. 5, and/or FIG. 6, as well as to implement various components depicted in FIG. 7 and/or FIG. 8.

These software modules are generally executed by processor 914 alone or in combination with other processors. Memory 925 used in the storage subsystem 924 can include a number of memories including a main random access memory ("RAM") 930 for storage of instructions and data during program execution and a read only memory ("ROM") 932 in which fixed instructions are stored. A file storage subsystem 926 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 926 in the storage subsystem 924, or in other machines accessible by the processor(s) 914.

Bus subsystem 912 provides a mechanism for letting the various components and subsystems of computing device 910 communicate with each other as intended. Although bus subsystem 912 is shown schematically as a single bus, alternative implementations of the bus subsystem may use multiple buses.

Computing device 910 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 910 are possible having more or fewer components than the computing device depicted in FIG. 9.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, the method includes receiving natural language (NL) input text that is generated based on user interface input from a user at a client device, wherein the NL input text is a portion of a user query. In some implementations, the method includes processing the NL input text using a language model to generate predicted completion text, wherein the predicted completion text is a prediction of an additional portion of the user query, and wherein the predicted completion text is distinct from the NL input text. In some implementations, the method includes performing an initial processing of the NL input text and the predicted completion text using a generative model to generate predicted output, wherein generating predicted output is based on decoding of only an initial portion of predicted output from initial processing using the generative model. In some implementations, the method includes causing output to be rendered, at the client device, that reflects the predicted completion text and the decoding of the initial portion of predicted output. In some implementations, the method includes receiving an indication of a user selection of the output. In some implementations, in response to receiving the indication of the selection of the output, the method includes continuing processing of the NL input text and the predicted completion text using the generative model to decode a remaining portion of predicted output. In some implementations, the method includes causing one or more actions to be performed based on the predicted output.

These and other implementations of the technology can include one or more of the following features.

In some implementations, causing the output to be rendered, at the client device, that reflects the predicted completion text and the decoding of the initial portion of predicted output includes rendering selectable output based on the predicted completion text. In some implementations, the method further includes receiving the indication of the user selection of the output includes receiving an indication the user selection of the selectable output based on the predicted completion text.

In some implementations, receiving the indication of the user selection of the output includes receiving a remaining portion of the user query based on additional user interface input from the user at the client device. In some implementations, the method further includes comparing the remaining portion of the user query with the predicted completion text. In some implementations, the method further includes receiving the indication of the user selection of the output based on the comparing.

In some implementations, processing the NL input text using the language model further includes generating alternative predicted completion text, wherein the alternative predicted completion text is an alternative prediction of an alternative additional portion of the user query, wherein the alternative predicted completion text is distinct from the predicted completion text, and wherein the alternative predicted completion text is distinct from the NL input text. In some implementations, the method further includes performing an alternative initial processing of the NL input text and the alternative predicted completion query text using the generative model to generate alternative predicted output, wherein generating alternative predicted output is based on decoding of only an alternative initial portion of alternative predicted output from initial processing using the generative model. In some implementations, the method further includes causing alternative output to be rendered, at the client device, that reflects the alternative predicted completion text and the decoding of the alternative initial portion of predicted output.

In some versions of those implementations, causing the output to be rendered, at the client device, that reflects the predicted completion text and the decoding of the initial portion of the predicted completion text includes rendering selectable output based on the predicted completion text. In some versions of those implementations, causing the alternative output to be rendered, at the client device, that reflects the alternative predicted completion text and the decoding of the alternative initial portion of predicted output includes rendering alternative selectable output based on the alternative predicted completion text.

In some versions of those implementations, receiving the indication of the user selection of the output comprises receiving an indication of the user selection of the selectable output based on the predicted includes text in lieu of receiving an indication of the user selection of the alternative selectable output based on the alternative predicted completion text.

In some implementations, the language model is distinct from the generative model. In some versions of those implementations, the language model is stored in a first portion of memory and the generative model is stored in a second portion of memory, where the first portion of memory is smaller than the second portion of memory. In some versions of those implementations, the language model is stored locally at the client device and the generative model is stored on a server remote from the client device.

In some implementations, the generative model is used as the language model in processing the NL input text to generate the predicted completion text.

In some implementations, the user interface input from the user of the client device is text input from a keyboard of the client device.

In some implementations, the user interface input from the user of the client device is audio data capturing a spoken utterance of the user, and wherein the NL input text is generated based on processing the audio data using an automatic speech recognition model.

In some implementations, a method implemented by one or more processors is provided, the method includes receiving natural language (NL) input text that is generated based on user interface input from a user of a client device, wherein the NL input text is a portion of a user query. In some implementations, the method includes processing the NL input text using a language model to generate predicted completion text, wherein the predicted completion text is a prediction of an additional portion of the user query, and wherein the predicted completion text is distinct from the NL input text. In some implementations, the method includes causing predicted completion text output to be rendered, at the client device, that reflects the predicted completion text. In some implementations, in response to causing the predicted completion text output to be rendered at the client device, the method includes performing an initial generative model processing of the NL input text and the predicted completion text. In some implementations, the method includes receiving an indication of a user selection of the predicted completion text output. In some implementations, in response to receiving the indication of the user selection of the predicted completion text output, the method includes continue processing of the NL input text and the predicted completion text using the generative model to generate query response output. In some implementations, the method includes causing one or more actions to be performed based on the query response output.

These and other implementations of the technology can include one or more of the following features.

In some implementations, performing the initial processing of the NL input text and the predicted completion text using the generative model includes performing one or more lookups in a vector database based on the NL input text and the predicted completion text, where the one or more lookups are utilized in retrieval augmented generation for the generative model.

In some implementations, processing the NL input text using the language model to generated predicted completion text includes generating one or more instances of candidate predicted completion text based on processing the NL input text using the language model. In some implementations, the method further includes selecting one or more of the instances of candidate predicted completion text. In some versions of those implementations, causing the predicted completion text output to be rendered, at the client device, that reflects the predicted completion text includes causing the predicted completion text output to be rendered based on the one or more selected instances of candidate predicted completion text. In some versions of those implementations, selecting the one or more instances of candidate predicted completion text includes, for each of the one or more instances of candidate prediction text, generating a likelihood score indicating a likelihood the corresponding instance of candidate prediction text completes the user query. In some implementations, the method further includes determining whether the likelihood score satisfies a threshold value. In some implementations, in response to determining the likelihood score satisfies the threshold value, the method includes selecting the corresponding instance of candidate prediction text. In some versions of those implementations, selecting the one or more instances of candidate predicted completion text includes, for each of the one or more instances of candidate prediction text, generating a likelihood score indicating a likelihood the corresponding instance of candidate prediction text completes the user query. In some implementations, the method further includes selecting the instance of candidate prediction text with the highest corresponding likelihood score. In some versions of those implementations, selecting the one or more instances of candidate predicted completion text includes determining an availability of computational resources for the generative model. In some implementations, in response to determining the availability of computational resources for the generative model satisfies a threshold value, the method further includes selecting all of the instances of candidate predicted completion text. In some versions of those implementations, selecting the one or more instances of candidate predicted completion text includes determining an availability of computational resources for the generative model. In some versions of those implementations, in response to determining the availability of computational resources for the generative model fails to satisfy a threshold value, for each of the one or more instances of candidate prediction text, the method further includes generating a likelihood score indicating a likelihood the corresponding instance of candidate prediction text completes the user query. In some implementations, the method further includes selecting the instance of candidate prediction text with the highest corresponding likelihood score.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more computer readable storage media (e.g., transitory or non-transitory) storing computer instructions executable by one or more processors to perform any of the aforementioned methods. Some implementations also include a computer program product including instructions executable by one or more processors to perform any of the aforementioned methods.

What is claimed is:

1. A method implemented by one or more processors, the method comprising:

- receiving natural language (NL) input text that is generated based on user interface input from a user at a client device, wherein the NL input text is a portion of a user query;
- processing the NL input text using a language model to generate predicted completion text, wherein the predicted completion text is a prediction of an additional portion of the user query, and wherein the predicted completion text is distinct from the NL input text;
- performing an initial processing of the NL input text and the predicted completion text using a generative model to generate a decoding of only an initial portion of predicted output generated from the initial processing using the generative model;
- causing output to be rendered, at the client device, that reflects the predicted completion text and the decoding of the initial portion of predicted output;
- receiving an indication of a user selection of the output;
- in response to receiving the indication of the selection of the output:
  - continuing processing of the NL input text and the predicted completion text using the generative model to generate a decoding of a remaining portion of predicted output; and
  - causing one or more actions to be performed based on the predicted output.

2. The method of claim 1, wherein causing the output to be rendered, at the client device, that reflects the predicted completion text and the decoding of the initial portion of predicted output comprises rendering selectable output based on the predicted completion text; and wherein receiving the indication of the user selection of the output comprises receiving an indication of the user selection of the selectable output based on the predicted completion text.

3. The method of claim 1, wherein receiving the indication of the user selection of the output comprises:

receiving a remaining portion of the user query based on additional user interface input from the user at the client device;

comparing the remaining portion of the user query with the predicted completion text; and receiving the indication of the user selection of the output based on the comparing.

4. The method of claim 1, wherein processing the NL input text using the language model further comprises generating alternative predicted completion text, wherein the alternative predicted completion text is an alternative prediction of an alternative additional portion of the user query, wherein the alternative predicted completion text is distinct from the predicted completion text, and wherein the alternative predicted completion text is distinct from the NL input text; and further comprising:

performing an alternative initial processing of the NL input text and the alternative predicted completion text using the generative model to generate alternative predicted output, wherein generating alternative predicted output is based on decoding of only an alternative initial portion of alternative predicted output from initial processing using the generative model; and causing alternative output to be rendered, at the client device, that reflects the alternative predicted completion text and the decoding of the alternative initial portion of predicted output.

5. The method of claim 4, wherein causing the output to be rendered, at the client device, that reflects the predicted completion text and the decoding of the initial portion of the predicted output comprises rendering selectable output based on the predicted completion text; and wherein causing the alternative output to be rendered, at the client device, that reflects the alternative predicted completion text and the decoding of the alternative initial portion of predicted output comprises rendering alternative selectable output based on the alternative predicted completion text.

6. The method of claim 5, wherein receiving the indication of the user selection of the output comprises receiving an indication of the user selection of the selectable output based on the predicted completion text in lieu of receiving an indication of the user selection of the alternative selectable output based on the alternative predicted completion text.

7. The method of claim 1, wherein the language model is distinct from the generative model.

8. The method of claim 7, wherein the language model is stored in a first portion of memory and the generative model is stored in a second portion of memory, where the first portion of memory is smaller than the second portion of memory.

9. The method of claim 7, wherein the language model is stored locally at the client device and the generative model is stored on a server remote from the client device.

10. The method of claim 1, wherein the generative model is used as the language model in processing the NL input text to generate the predicted completion text.

11. The method of claim 1, wherein the user interface input from the user of the client device is text input from a keyboard of the client device.

12. The method of claim 1, wherein the user interface input from the user of the client device is audio data capturing a spoken utterance of the user, and wherein the NL input text is generated based on processing the audio data using an automatic speech recognition model.

13. A system comprising:

memory storing instructions; and one or more processors operable to execute the instructions to:

receive natural language (NL) input text that is generated based on user interface input from a user at a client device, wherein the NL input text is a portion of a user query;

process the NL input text using a language model to generate predicted completion text, wherein the predicted completion text is a prediction of an additional portion of the user query, and wherein the predicted completion text is distinct from the NL input text;

perform an initial processing of the NL input text and the predicted completion text using a generative model to generate a decoding of only an initial portion of predicted output generated from the initial processing using the generative model;

cause output to be rendered, at the client device, that reflects the predicted completion text and the decoding of the initial portion of predicted output;

receive an indication of a user selection of the output;

in response to receiving the indication of the selection of the output:

continue processing of the NL input text and the predicted completion text using the generative model to generate a decoding of a remaining portion of predicted output; and cause one or more actions to be performed based on the predicted output.

14. The system of claim 13, wherein in causing the output to be rendered, at the client device, that reflects the predicted completion text and the decoding of the initial portion of predicted output, one or more of the processors are to render selectable output based on the predicted completion text; and wherein in receiving the indication of the user selection of the output, one or more of the processors are to receive an indication of the user selection of the selectable output based on the predicted completion text.

15. The system of claim 13, wherein in receiving the indication of the user selection of the output, one or more of the processors are to:

receive a remaining portion of the user query based on additional user interface input from the user at the client device;

compare the remaining portion of the user query with the predicted completion text; and receive the indication of the user selection of the output based on the comparing.

16. The system of claim 13, wherein in processing the NL input text using the language model, one or more of the processors are to further:

generate alternative predicted completion text, wherein the alternative predicted completion text is an alternative prediction of an alternative additional portion of the user query, wherein the alternative predicted completion text is distinct from the predicted completion text, and wherein the alternative predicted completion text is distinct from the NL input text, perform an alternative initial processing of the NL input text and the alternative predicted completion text using the generative model to generate alternative predicted output, wherein generating alternative predicted output is based on decoding of only an alternative initial portion of alternative predicted output from initial processing using the generative model; and cause alternative output to be rendered, at the client device, that reflects the alternative predicted completion text and the decoding of the alternative initial portion of predicted output.

17. The system of claim 16, wherein in causing the output to be rendered, at the client device, that reflects the predicted completion text and the decoding of the initial portion of the predicted output, one or more of the processors are to render selectable output based on the predicted completion text; and wherein in causing the alternative output to be rendered, at the client device, that reflects the alternative predicted completion text and the decoding of the alternative initial portion of predicted output, one or more of the processors are to render alternative selectable output based on the alternative predicted completion text.

18. The system of claim 17, wherein in receiving the indication of the user selection of the output, one or more of the processors are to receive an indication of the user selection of the selectable output based on the predicted completion text in lieu of receiving an indication of the user selection of the alternative selectable output based on the alternative predicted completion text.

19. The system of claim 13, wherein the language model is distinct from the generative model.

20. The system of claim 19, wherein the language model is stored in a first portion of memory and the generative model is stored in a second portion of memory, where the first portion of memory is smaller than the second portion of memory.

* * * * *